(12) United States Patent
Ibragimov et al.

(10) Patent No.: US 10,470,255 B2
(45) Date of Patent: Nov. 5, 2019

(54) RF ENERGY APPLICATION BASED ON ELECTROMAGNETIC FEEDBACK

(71) Applicant: GOJI LIMITED, Hamilton (BM)

(72) Inventors: Zalman Ibragimov, Rehovot (IL); Leonid Gluhovsky, Tal-El (IL)

(73) Assignee: GOJI LIMITED, Hamilton (BM)

(*) Notice: Subject to any disclaimer, the term of this patent is extended or adjusted under 35 U.S.C. 154(b) by 652 days.

(21) Appl. No.: 14/412,018

(22) PCT Filed: Jul. 1, 2013

(86) PCT No.: PCT/IB2013/001972
§ 371 (c)(1),
(2) Date: Dec. 30, 2014

(87) PCT Pub. No.: WO2014/006510
PCT Pub. Date: Jan. 9, 2014

(65) Prior Publication Data
US 2015/0156827 A1 Jun. 4, 2015

Related U.S. Application Data

(60) Provisional application No. 61/712,356, filed on Oct. 11, 2012, provisional application No. 61/667,078, filed on Jul. 2, 2012.

(51) Int. Cl.
*H05B 6/70* (2006.01)
*H05B 6/68* (2006.01)

(52) U.S. Cl.
CPC .............. *H05B 6/68* (2013.01); *H05B 6/688* (2013.01); *H05B 6/70* (2013.01); *H05B 6/705* (2013.01); *Y02B 40/143* (2013.01)

(58) Field of Classification Search
CPC . H05B 6/64; H05B 6/68; H05B 37/02; H05B 6/70; H05B 6/72; H05B 6/54;
(Continued)

(56) References Cited

U.S. PATENT DOCUMENTS 4,714,812 A 12/1987 Haagensen et al.
5,191,182 A 3/1993 Gelorme et al.
(Continued)

FOREIGN PATENT DOCUMENTS

EP 2440014 A1 4/2012
JP 2008-269793 11/2008
(Continued)

OTHER PUBLICATIONS

Search Report and Written Opinion in a related PCT application No. PCT/IB2013/001972 dated Jan. 20, 2014.
(Continued)

*Primary Examiner* — Tu B Hoang
*Assistant Examiner* — Masahiko Muranami
(74) *Attorney, Agent, or Firm* — Greenblum & Bernstein, P.L.C.

(57) ABSTRACT

A method of processing an object in an energy application zone by application of radio frequency (RF) energy via a plurality of radiating elements may include applying RF energy to the energy application zone at a first plurality of excitation setups (excitation setups). The method may also include applying RF energy to the energy application zone at one or more excitation setups, at least one of which is not included in the first plurality of excitation setups, based on feedback received from the energy application zone in response to the application of the first amount of energy to the energy application zone at the first plurality of excitation setups.

16 Claims, 7 Drawing Sheets

(58) Field of Classification Search
CPC ...... H05B 6/62; G05D 23/1917; G05B 13/02;
G05B 19/4148; G06Q 50/06; H02J
13/0075; H02J 2003/146; H02J 3/14;
Y10T 307/406; Y10T 307/438; Y10T
307/469; A21B 1/48; A21B 3/04; A47J
37/044; F24C 15/2021; F24C 15/325;
F24C 7/06; F24C 7/082; H01H 9/56
USPC ....... 219/709, 635, 702, 678, 694, 696, 701,
219/704, 708, 712, 715, 716, 717, 718,
219/744, 750, 261, 757, 679, 707, 734,
219/735, 739, 743, 756, 763; 700/14, 13,
700/17, 18, 210, 286, 291, 295, 296;
126/20, 20.1, 21 R, 273 A, 273 R, 299 D
See application file for complete search history.

(56) References Cited

U.S. PATENT DOCUMENTS

| | | |
|---|---|---|
| 5,241,040 A | 8/1993 | Cuomo et al. |
| 5,317,081 A | 5/1994 | Gelorme et al. |
| 5,340,914 A | 8/1994 | Cuomo et al. |
| 5,837,978 A | 11/1998 | Hatzakis, Jr. et al. |
| 6,020,579 A | 2/2000 | Lewis et al. |
| 6,020,580 A | 2/2000 | Lewis et al. |
| 6,054,696 A | 4/2000 | Lewis et al. |
| 6,072,167 A | 6/2000 | Lewis et al. |
| 6,097,019 A | 8/2000 | Lewis et al. |
| 6,121,595 A | 9/2000 | Lewis et al. |
| 6,150,645 A | 11/2000 | Lewis et al. |
| 8,492,686 B2 | 7/2013 | Bilchinsky et al. |
| 8,653,482 B2 | 2/2014 | Ben-Shmuel |
| 8,839,527 B2 | 9/2014 | Ben-Shmuel et al. |
| 2004/0134904 A1* | 7/2004 | Clemen, Jr. ............... H05B 6/72 219/709 |
| 2006/0232471 A1* | 10/2006 | Coumou ........... H01J 37/32082 342/450 |
| 2007/0138170 A1* | 6/2007 | Kim ....................... H05B 6/666 219/716 |
| 2008/0290087 A1* | 11/2008 | Ben-Shmuel ............. A23L 3/01 219/748 |
| 2009/0057302 A1* | 3/2009 | Ben-Shmuel ............ H05B 6/72 219/748 |
| 2009/0321427 A1* | 12/2009 | Hyde ................... H05B 6/6455 219/702 |
| 2009/0321429 A1* | 12/2009 | Hyde ................... H05B 6/6447 219/710 |
| 2010/0155392 A1* | 6/2010 | Nordh ...................... H05B 6/68 219/702 |
| 2010/0224623 A1* | 9/2010 | Yasui ..................... H05B 6/686 219/702 |
| 2011/0168695 A1 | 7/2011 | Okajima et al. |
| 2011/0198343 A1 | 8/2011 | Bilchinsky et al. |
| 2011/0266463 A1* | 11/2011 | Einziger ............... H05B 6/6402 250/492.1 |
| 2011/0290790 A1 | 12/2011 | Sim et al. |
| 2012/0061384 A1* | 3/2012 | Kasai .................... H01L 21/324 219/718 |
| 2012/0097665 A1 | 4/2012 | Bilchinsky et al. |
| 2012/0103972 A1 | 5/2012 | Okajima |
| 2012/0103973 A1 | 5/2012 | Rogers et al. |
| 2012/0122072 A1 | 5/2012 | Bilchinsky et al. |
| 2012/0164022 A1 | 6/2012 | Muginstein et al. |
| 2012/0312801 A1 | 12/2012 | Bilchinsky et al. |
| 2013/0048880 A1 | 2/2013 | Einziger et al. |
| 2013/0048881 A1 | 2/2013 | Einziger et al. |
| 2013/0062334 A1 | 3/2013 | Bilchinsky et al. |
| 2013/0080098 A1 | 3/2013 | Hadad et al. |
| 2013/0087545 A1 | 4/2013 | Bilchinsky et al. |
| 2013/0146590 A1 | 6/2013 | Einziger et al. |
| 2013/0200065 A1 | 8/2013 | Libman et al. |
| 2013/0200066 A1 | 8/2013 | Gelbart et al. |
| 2013/0240757 A1 | 9/2013 | Einziger et al. |
| 2013/0248521 A1 | 9/2013 | Torres et al. |
| 2013/0284725 A1 | 10/2013 | Bilchinsky et al. |
| 2013/0306627 A1 | 11/2013 | Libman et al. |
| 2013/0334214 A1 | 12/2013 | Yogev et al. |
| 2014/0247060 A1 | 9/2014 | Ben Haim et al. |
| 2014/0287100 A1 | 9/2014 | Libman |
| 2014/0345152 A1 | 11/2014 | Ben-Shmuel et al. |
| 2015/0034632 A1 | 2/2015 | Brill et al. |
| 2015/0070029 A1 | 3/2015 | Libman et al. |

FOREIGN PATENT DOCUMENTS

| | | |
|---|---|---|
| WO | 2011/138688 A2 | 11/2011 |
| WO | 2012/051198 A1 | 4/2012 |
| WO | 2012/066419 A1 | 5/2012 |

OTHER PUBLICATIONS

International Preliminary Report on Patentability in a related PCT application No. PCT/IB2013/001972 dated Jan. 6, 2015.

* cited by examiner

RF ENERGY APPLICATION BASED ON ELECTROMAGNETIC FEEDBACK

This application claims the benefit of priority to U.S. Provisional Patent Applications Nos. 61/667,078 and 61/712,356, filed on Jul. 2, 2012 and Oct. 11, 2012, respectively, which are incorporated herein in their entirety.

TECHNICAL FIELD

This is a Patent Application relating to a device and method for applying electromagnetic energy, and more particularly, but not exclusively, to device and method for applying RF energy based on electromagnetic feedback.

BACKGROUND

Electromagnetic waves have been used in various applications to supply energy to objects. In the case of radio frequency (RF) radiation for example, electromagnetic energy may be supplied using a magnetron, which is typically tuned to a single frequency for supplying electromagnetic energy only in that frequency. One example of a commonly used device for supplying RF energy is a microwave oven. Typical microwave ovens supply electromagnetic energy at or about a single frequency of 2.45 GHz.

SUMMARY OF A FEW EXEMPLARY ASPECTS OF THE DISCLOSURE

The drawings and detailed description which follow contain numerous alternative examples consistent with the invention. A summary of every feature disclosed is beyond the object of this summary section. For a more detailed description of exemplary aspects of the invention, reference should be made to the drawings, detailed description, and claims, which are incorporated into this summary by reference.

An aspect of some embodiments of the invention may include a method of processing an object in an energy application zone by application of radio frequency (RF) energy via a plurality of radiating elements. The method may include: (a) applying a first amount of RF energy to the energy application zone at a first plurality of excitation setups and (b) applying a second amount of RF energy to the energy application zone at one or more excitation setups, not included in the first plurality of excitation setups, based on feedback received from the energy application zone in response to the application of the first amount of energy to the energy application zone at the first plurality of excitation setups. In some embodiments, applying RF energy at the one or more excitation setups may include applying energy at two or more radiating elements at a controlled phase difference or combination of one or more phase differences (hereinafter phase relation or phase combination).

An aspect of some embodiments of the invention may include an apparatus for processing an object in an energy application zone with radio frequency (RF) energy applied via a plurality of radiating elements. The apparatus may include a detection unit and a controller. The detection unit may be configured to detect electromagnetic feedback from the energy application zone. The controller may be configured to cause application of a first amount of RF energy to the energy application zone at a first plurality of excitation setups; receive, from the detection unit, feedback resulting from the application of the first amount of RF energy at the first plurality of excitation setups; and cause, based on the feedback received from the detection unit, application of a second amount of RF energy to the energy application zone at one or more excitation setups not included in the first plurality of excitation setups. The processor may be configured to cause the application of the second amount of RF energy through two or more radiating elements at a controlled phase relation.

An aspect of some embodiments of the invention may include a method of processing an object in an energy application zone by application of radio frequency (RF) energy via a plurality of radiating elements. The method may include applying RF energy repetitively, wherein each repetition comprises: (a) applying a first amount of RF energy to the energy application zone at a first plurality of excitation setups through one radiating element at a time; and (b) applying a second amount of RF energy to the energy application zone at one or more excitation setups via two or more radiating elements at overlapping time periods, at a common frequency, and at controlled phase relations. In some embodiments, an average amount of energy applied per excitation setup during the second energy application may be larger than the average amount of energy applied per excitation setup during the first energy application.

An aspect of some embodiments of the invention may include an apparatus for processing an object in an energy application zone by application of radio frequency (RF) energy via a plurality of radiating elements. The apparatus may include a controller configured to: (a) cause application of a first amount of RF energy to the energy application zone at a first plurality of excitation setups through one radiating element at a time; and (b) cause application of a second amount of RF energy to the energy application zone at one or more excitation setups via two or more radiating elements at overlapping time periods, at a common frequency, and at controlled phase relation, based on feedback received from the energy application zone in response to the application of the first amount of energy.

An aspect of some embodiments of the invention may include a method of processing an object in an energy application zone by applying RF energy to the energy application zone at excitation setups, each being characterized by two or more radiating elements that emit, at overlapping time periods, signals of a common frequency. The method may include: calculating values indicative of energy absorbable in the object at multiple excitation setups, characterized by a common frequency and differing phase combinations, amplitude combinations, or both phase combinations and amplitude combinations, the calculation being based on measurements taken at other excitation setups characterized by the common frequency, and applying the RF energy based on the calculated values.

An aspect of some embodiments of the invention may include an apparatus for processing an object in an energy application zone by applying RF energy to the energy application zone at excitation setups, each being characterized by two or more radiating elements that emit, at overlapping time periods, signals of a common frequency. The apparatus may include a processor configured to: calculate values indicative of energy absorbable in the object at multiple excitation setups characterized by a common frequency, based on measurements taken at other excitation setups characterized by the common frequency, the multiple excitation setups being further characterized by differing phase combinations, amplitude combinations, or both phase combinations and amplitude combinations, and regulate a source to apply the RF energy based on the calculated values.

An aspect of some embodiments of the invention may include an apparatus for processing an object in an energy application zone by application of radio frequency (RF) energy via a plurality of radiating elements. The apparatus may include at least one controller configured to:
  (a) cause application of a first amount of RF energy to the energy application zone at a common frequency through one radiating element at a time; and
  (b) cause application of a second amount of RF energy to the energy application zone via two or more radiating elements at overlapping time periods, at the common frequency and at controlled phase relations, based on feedback received from the energy application zone in response to the application of the first amount of energy.

In some embodiments, the at least one controller may be further configured to
  determine absorption efficiencies at a plurality of phase relations based on the feedback;
  select one or more of the plurality of phase relations based on the determined absorption efficiencies; and
  cause application of the second amount of energy at the selected one or more phase relations.

An aspect of some embodiments of the invention may include an apparatus for processing an object in an energy application zone with radio frequency (RF) energy via a plurality of radiating elements. The apparatus may include a processor configured to:
  receive feedback at a first plurality of excitation setups;
  calculate control parameters at each excitation setup of a second plurality of excitation setups, the second plurality comprising at least one excitation setup not comprised in the first plurality; and
  cause application of RF energy at one or more of the excitation setups included in the second plurality, based on the calculated control parameters. A control parameter may be any parameter, according to which energy application may be controlled. In some embodiments, the control parameters are indicative of the response of the energy application zone with the object therein to an incoming electrical signal, for example, s parameters, other network parameters, gamma parameters, or combinations thereof, for example, dissipation ratios.

In some embodiments, a number of excitation setups included in the second plurality of excitation setups is larger than a number of excitation setups included in the first plurality of excitation setups by a factor equal to 4 or more.

In some embodiments, the processor may be configured to cause application of RF energy at the one or more excitation setups via two or more of the radiating elements at overlapping time periods and at a common frequency.

In some embodiments, the processor may be configured to cause application of RF energy at the first plurality of excitation setups via two or more of the radiating elements at overlapping time periods and at a common frequency.

In some embodiments, the feedback includes substantially only absolute values or other real values. In some embodiments, complex control parameters may be calculated based on real feedback values.

In some embodiments, the processor may be configured to cause application of RF energy at one or more of the excitation setups included in the second plurality, based only on the absolute values of the calculated control parameters.

In some embodiments, the processor may be configured to calculate the control parameters based on absolute values only.

An aspect of some embodiments of the invention may include a method of processing an object in an energy application zone by application of radio frequency (RF) energy via a plurality of radiating elements. The method may include:
  (a) applying a first amount of RF energy to the energy application zone at a first plurality of excitation setups;
  (b) calculating, based on feedback received from the energy application zone during the application of the first amount of energy, S parameters at one or more excitation setups not included in the first plurality of excitation setups; and
  (c) applying, based on the calculated S parameters, a second amount of RF energy to the energy application zone at one or more excitation setups not included in the first plurality of excitation setups.

In some embodiments, the second amount of RF energy may be applied through multiple radiating elements at a common frequency and during overlapping time periods.

In some embodiments, the second amount of RF energy may be applied through multiple radiating elements at controlled phase relations.

In some embodiments, calculating comprises analytically calculating.

In some embodiments, the method includes multiple repetitions of (a), (b), and (c). In some such embodiments, in at least one of the repetitions, applying the second amount of energy is accomplished by applying energy only at excitation setups not included in the first plurality of excitation setups.

In some embodiments, the method may include:
  calculating S parameters at a second plurality of excitation setups;
  selecting the one or more excitation setups from the second plurality of excitation setups based on the calculated S parameters; and
  applying the second amount of RF energy at the selected one or more excitation setups.

In some embodiments, calculating comprises calculating S parameters at some excitation setups based on gamma parameters measured at other excitation setups.

In some embodiments, calculating comprises calculating complex S parameters based on scalar gamma parameters.

In some embodiments, the first amount of RF energy is applied through multiple radiating elements at controlled phase relations.

In some embodiments, calculating comprises calculating S parameters at excitation setups that comprise phase relations.

BRIEF DESCRIPTION OF THE DRAWINGS

Some embodiments of the invention are herein described, by way of examples only, with reference to the accompanying drawings. With specific references now to the drawings in detail, it is contemplated that the particulars shown are exemplary and for purposes of illustrative discussion only. In this regard, the description of the drawings provides examples to those skilled in the art how embodiments of the invention may be practiced.

DETAILED DESCRIPTION

Figure 1A:
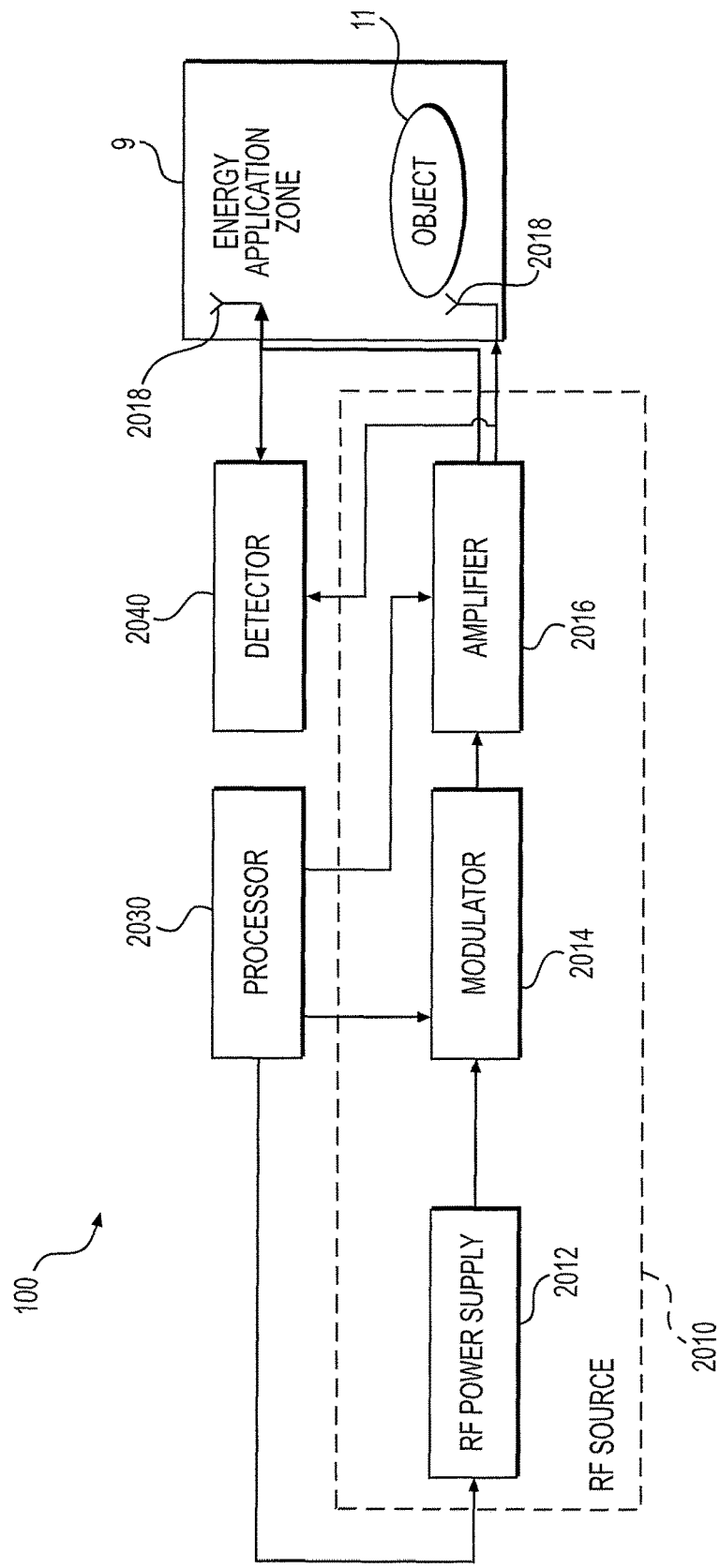
FIG. 1A is a diagrammatic representation of an apparatus for applying electromagnetic energy to an object, in accordance with some exemplary embodiments of the present invention.

Reference will now be made in detail to exemplary embodiments of the invention, examples of which are illustrated in the accompanying drawings. When convenient, the same reference numbers are used throughout the drawings to refer to the same or like parts.

Disclosed embodiments may involve apparatus and methods for processing (e.g., heating) an object, in an energy application zone, by applying RF energy. An aspect of some embodiments of the invention relates to coherent application of RF energy. As used herein, coherent application of energy includes energy application through two or more radiating elements at the same time and at the same frequency. In other words, coherent application of energy includes energy application through two or more radiating elements at overlapping time periods and at a common frequency. Coherent energy application may cause excitation of a large variety of field patterns even at a single frequency. This may be advantageous, for example, for enhancing heating uniformity, since different field patterns may cause heating at different regions across the energy application zone, and variety of field patterns may cause heating at a many different regions across the energy application zone, thus enhancing heating uniformity. Enlarging the variety of field patterns in non-coherent energy application may be achieved, for example, by applying energy at various frequencies (e.g., at a frequency band), however, the frequency bands available for industrial, scientific, or medical usage (ISM bands) are limited. Coherent energy application may make use of the limited bandwidth to excite a variety of field patterns at each frequency.

Coherent energy application may be characterized by the frequency at which energy is applied, amplitudes of signals emitted by different ones of the radiating elements, and phases differences between signals emitted by different ones of the radiating elements. When three or more radiating elements take part in the coherent energy application, for example, radiating elements A, B, and C, more than one phase difference may exist. For example, one phase difference may exist between signals emitted by radiating elements A and B, and another phase difference may exist between signals emitted by radiating elements A and C. In the following, the term phase combination will be used to refer to phase differences between two, three, or more radiating elements, with the understanding that in case of two radiating elements the combination includes a single phase difference. Similarly, the term amplitude combination will be used. A combination of frequency, phase combination, and amplitude combination will be referred to herein as an excitation setup. The term phase combination is used herein interchangeably with phase relation, and the term amplitude combination is used herein interchangeably with amplitude relation.

In some embodiments of the invention, the application of energy is based on feedback from the energy application zone. For example, the feedback may be indicative of quality of the processing, and the feedback may enable association of different quality values with different excitation setups. Then, excitation setups may be selected based on qualities associated with them, and energy may be applied, for example, only at excitation setups associated with desired heating qualities. Different embodiments may utilize different qualities. For example, in some embodiments, a quality may be related to the absorption efficiency of the energy application zone at the corresponding excitation setup. In a specific example, the energy application zone may include the object to be heated, and the zone with the object therein may absorb some of the energy applied to it. Some of the absorbed energy may be absorbed in the object to cause heating of the object. In some embodiments, more absorbed energy (at a given amount of supplied energy) may be considered higher quality. In such embodiments, there may be a minimum threshold, and only excitation setups associated with absorption efficiencies above the threshold may be selected or used. The absorption efficiency may be defined as the ratio between absorbed energy (or power) and supplied energy (or power). In some embodiments, at each frequency, the excitation setups associated with the highest absorption efficiency value or values may be used. These may include, for example, a predetermined number of excitation setups per frequency. For example, at each frequency, the 10 excitation setups associated with the highest absorption efficiencies may be selected for energy application. In some embodiments, there may be a maximum threshold for absorption efficiency, and excitation setups associated with higher absorption efficiencies may be excluded or not selected for application, for example, because they may be associated with overheating (e.g., burning) of the object. In some embodiments, both minimum and maximum thresholds may be used, and in some embodiments, thresholds may be used in combination with a number of excitation setups per frequency. These are only some examples of how excitation setups may be selected based on absorption efficiencies.

When there are many excitation setups to select from, obtaining the feedback at each excitation setup may require relatively long time periods devoted to collecting feedback. In some cases, it may be advantageous to shorten these time periods. In some embodiments of the invention, such shortening of feedback collecting periods may be achieved by measuring feedback at some excitation setups, and based on this feedback, calculating the heating efficiency (or any other quality indicator) at the other excitation setups.

Thus, in accordance with some aspects of the present invention, there is provided a method of processing (e.g., heating) an object in an energy application zone by applying microwave (or other RF) energy to the energy application zone. The method may include calculating quality indicators at some excitation setups based on measurements taken at other excitation setups, and applying the energy based on the quality indicators. The measurements may include receiving feedback, for example, as discussed above. In particular, the method may include calculating quality indicators for a plurality of excitation setups that have a common frequency and differ in phase combination and/or in amplitude combination.

Similarly, an apparatus for processing an object may be provided with a processor configured to calculate quality indicators at some excitation setups based on feedback values obtained at other excitation setups, and cause application of RF energy to the energy application zone based on the calculated quality indicators. Here also, the calculation may be for excitation setups that have a common frequency and differ in phase combination and/or in amplitude combination. In some embodiments, the processor may be configured to send a phase control signal to a source of RF energy, to control the phase combination of an excitation setup used for heating.

While the invention is not limited to any particular quality indicator or to a manner of calculation, the following examples will use absorption efficiencies (also referred to herein as heating efficiencies) as examples of quality indicators, and describe two exemplary methods for calculating them. Absorption efficiencies may be indicative of the dielectric response of the energy application zone and/or the object to electromagnetic fields excited in the zone. A quality indicator may include any value indicative of energy absorbable in the object. Such a quality indicator may correspond to or constitute, for example, an absorption efficiency (also referred to herein as dissipation ratio, or DR). In other embodiments, the quality factor may include any variable that relates to the dissipation ratio, including, for example, the loss, which may be expressed as 1-DR, a non-normalized loss, which may be expressed as (1-DR)A, where A stands for the sum of amplitudes of the signals supplied to generate the excitation setups, etc. Other parameters, which may be used for calculating the dissipation ratio or that may otherwise be indicative of a dissipation ratio may also be used as quality indicators. A quality indicator may also be referred to herein as absorbability indicator, or AI.

One way of calculating absorption efficiency at many excitation setups based on feedback received at a small number of excitation setups may be by measuring feedback in response to signals applied by each of the radiating elements alone, and then summing up the effect of these signals when they are applied during overlapping time periods and at given phase combinations and/or amplitude combinations. This summation may not constitute simple addition, because there may be interference between the signals. If, during the coherent energy application, there are n radiating elements radiating at overlapping time periods, each radiating element k radiates at amplitude $a_k$ and at a phase $\varphi_k$, the DR may be given by equation A below:

$$DR = 1 - \frac{\sum_{i=1}^{n} \left| \sum_{k=1}^{n} S_{ik} a_k e^{j\varphi_k} \right|^2}{\sum_{k=1}^{n} a_k^2} \quad (A)$$

In equation A, $S_{ik}$ is a scattering parameter (also referred to as S parameter), defined as $$S_{ik} = \frac{V_i^-}{V_k^+},$$

where $V_i^-$ is voltage received at radiating element i when voltage $V_k^+$ is supplied to radiating element k. The S parameters may be represented as complex numbers, and each may have a magnitude and a phase. To omit confusion between a phase of an S parameter and a phase difference between signals emitted concurrently, the terms phase difference, phase relation, or phase combinations are used herein for the latter case. The S parameters may be indicative of the electrical response of the cavity to electrical signal applied to the cavity. This response may depend upon the presence and/or nature of an object in the cavity. Therefore, the electrical response (or S parameters) may be attributed to the cavity and the object, or to the energy application zone and the object.

Measuring all the available S parameters may require applying energy through one radiating element at a time. For example, if four radiating elements are involved, four transmissions may be sufficient, one through each radiating element, since each transmission may allow measuring four S parameters. For example, transmitting through radiating element No. 1 allows to measure: $S_{11}$; $S_{12}$; $S_{13}$; and $S_{14}$. The number of excitation setups, for which DR may be calculated based on such four transmissions and equation (A) may be unlimited.

Another way of calculating absorption efficiency at many excitation setups based on feedback received at a small number of excitation setups may involve measuring only scalar parameters, and calculating the complex S parameters based on these scalar parameters. Calculating DR based on the complex S parameters is then allowed using equation (A) above for an unlimited number of excitation setups (e.g., excitation setups having a common frequency and differing in phase combinations). This approach may have an advantage in that the measurement equipment may be less expensive, since there is no need to measure phases of feedback parameters; however, this approach may require more measurements and more calculations. A feedback parameter may include any parameter, the value of which is received as feedback (e.g., S parameters, gamma parameters) or calculated based on received feedback (e.g., heating efficiency). In some embodiments, the scalar parameters to be measured include the ratios between power received at each radiating element and power supplied to the same radiating element during coherent energy application. Mathematically this may be expressed as $|\Gamma_i|^2 = P_{ir}/P_{if}$; wherein $|\Gamma_i|^2$ is the magnitude of a gamma parameter associated with the $i^{th}$ radiating element, $P_{ir}$ is the power received at the "rewind" direction (going from the energy application zone through the $i^{th}$ radiating element to the detector); and $P_{if}$ is the power measured at the "forward" direction (going from the source to the energy application zone through the $i^{th}$ radiating element). Using the gamma parameters, DR may be calculated according to equation (B) below:

$$DR = 1 - \frac{\sum_{i=1}^{n} a_i^2 |\Gamma_i|^2}{\sum_{i=1}^{n} a_i^2} \quad (B)$$

Thus, DR values calculated based on measurement of the gamma parameters at given phase and amplitude combinations may be inserted in equation (A). The number of unknowns in equation A is twice the number of S parameters (since each has a magnitude and a phase). The number of S parameters is $n^2$, so in the case of four radiating elements discussed above, there are 32 unknowns. After measuring DR values at 32 excitation setups, the 32 equations with 32 unknowns may be solved to obtain the complex S parameters. It is noted that in practice a smaller number of measurements may be required, because additional equations may exist. For example, with respect to equations relating values of gamma parameters and S parameters, and equations relating S parameters and themselves, for example, it may be known (at least for some cases) that $S_{ik}=S_{ki}$ for every value of k and i. This alone reduces the number of unknowns from 32 to 20 in the above example.

In one respect, the invention may involve apparatus and methods for applying electromagnetic energy. The term electromagnetic energy, as used herein, includes energy deliverable by electromagnetic radiation in the radio frequency (RF) portion of the electromagnetic spectrum (between 3 kHZ and 300 GHz). In some examples, the applied electromagnetic energy may fall within frequency bands between 500 MHz to 1500 MHz or between 700 MHz to 1200 MHz or between 800 MHz-1 GHz. Applying energy in the RF portion of the electromagnetic spectrum is referred herein as applying RF energy. Thus, electromagnetic energy and RF energy are used herein interchangeably. Microwave and ultra high frequency (UHF) energy, for example, are both within the RF range. In some other examples, the applied electromagnetic energy may fall only within one or more industrial, scientific and medical (ISM) frequency bands, for example, between 433.05 and 434.79 MHz, between 902 and 928 MHz, between 2400 and 2500 MHz, and/or between 5725 and 5875 MHz.

Figure 1B:
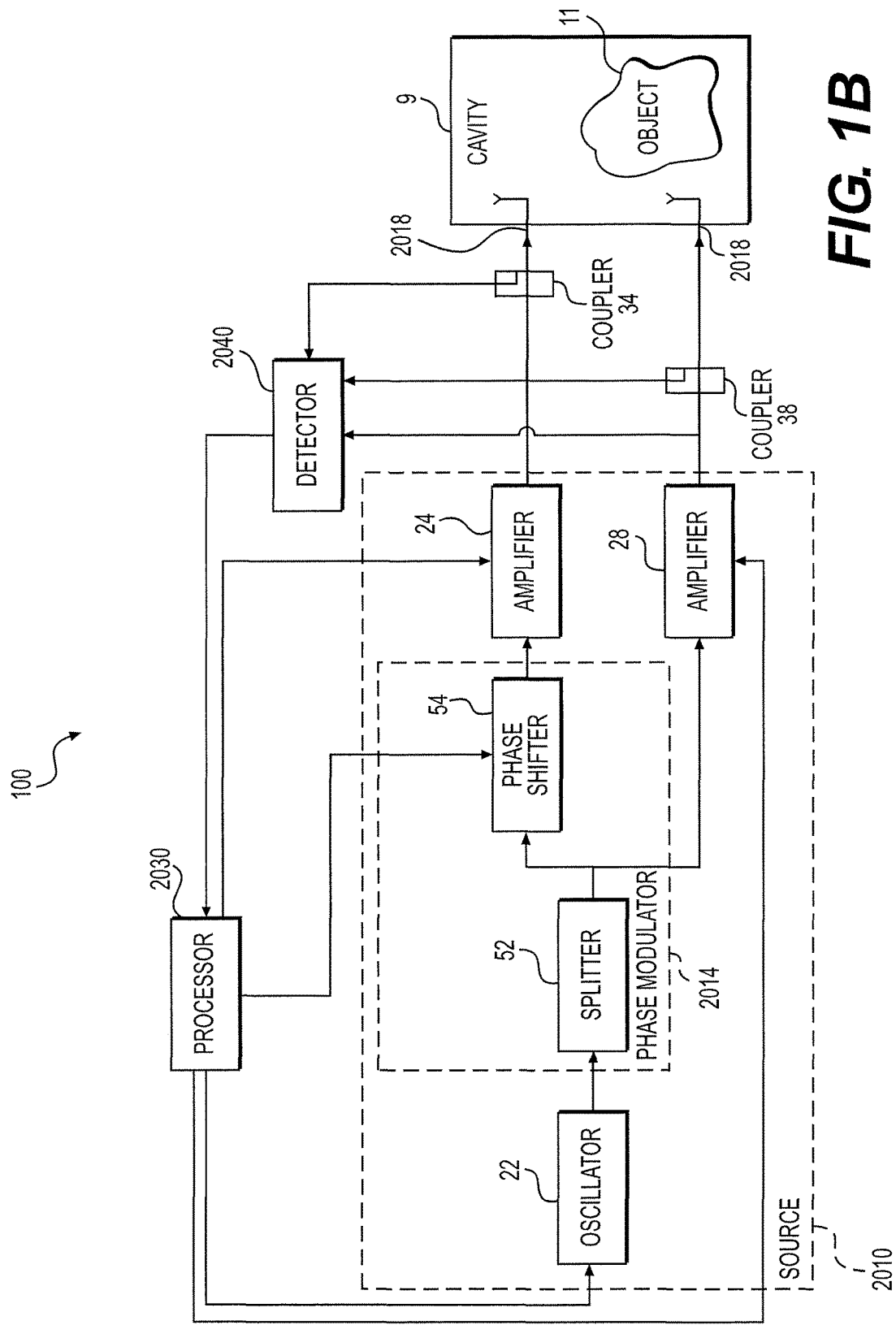
FIG. 1B is a diagrammatic representation of an apparatus for applying electromagnetic energy to an object, in accordance with some exemplary embodiments of the present invention.

In certain embodiments, the application of electromagnetic energy may occur in an "energy application zone", such as energy application zone 9 (also referred herein as cavity), as shown in FIG. 1A or 1B. Energy application zone 9 may include any void, location, region, or area where electromagnetic energy may be applied. It may be hollow, or may be filled or partially filled with liquids, solids, gases, or combinations thereof. By way of example only, energy application zone 9 may include an interior of an enclosure, interior of a partial enclosure, open space, solid, or partial solid, that allows existence, propagation, and/or resonance of electromagnetic waves. In some embodiments, energy application zone 9 may include the interior of a cavity (e.g., a resonant cavity), may constitute a cavity, or may be limited to a portion of a cavity. Zone 9 may include a conveyor belt or a rotating plate. At times, energy application zone 9 may be congruent with the object or a portion of the object (e.g., the object or a portion thereof, is or may define the energy application zone). It is to be understood that an object is considered "in" the energy application zone if at least a portion of the object is located in the zone or if some portion of the object receives delivered electromagnetic radiation.

In accordance with some embodiments of the invention, an apparatus or method may involve the use of at least one source configured to deliver electromagnetic energy to the energy application zone (e.g., configured to supply energy to the radiating element(s)). A "source" may include any component(s) that are suitable for generating and delivering electromagnetic energy. Consistent with some embodiments of the invention, electromagnetic energy may be delivered to the energy application zone in the form of propagating electromagnetic waves at predetermined wavelengths or frequencies (also known as electromagnetic radiation). As used consistently herein, "propagating electromagnetic waves" may include resonating waves, evanescent waves, and waves that travel through a medium in any other manner.

As used herein, if a machine (e.g., a processor) is described as "configured to" perform a task (e.g., configured to cause application of a predetermined field pattern), then, at least in some embodiments, the machine may include components, parts, or aspects (e.g., software) that enable the machine to perform the particular task. In some embodiments, the machine performs this task during operation. Similarly, when a task is described as being done "in order to" establish a target result (e.g., in order to apply a plurality of electromagnetic field patterns to the object), then, at least in some embodiments, carrying out the task would accomplish the target result.

In certain embodiments, electromagnetic energy may be applied to an object 11. References to an "object" to which electromagnetic energy is applied is not limited to a particular form. An object may include a liquid, semi-liquid, solid, semi-solid, or gas, depending upon the particular process with which the invention is utilized. The object may also include composites or mixtures of matter in differing phases. Thus, by way of non-limiting example, the term "object" encompasses such matter as food to be defrosted or cooked; clothes or other wet material to be dried; frozen organs or other biological materials to be thawed; chemicals to be reacted; fuel or other combustible material to be combusted; hydrated material to be dehydrated, gases to be expanded; liquids to be heated, boiled or vaporized, or any other material for which there is a desire to apply, even nominally, electromagnetic energy.

In some embodiments, object 11 may constitute at least a portion of a load. For example, a portion of electromagnetic energy delivered to energy application zone 9 may be absorbed by object 11. In some embodiments, another portion of the electromagnetic energy delivered to energy application zone 9 may be absorbed by various elements associated with energy application zone 9 (e.g., additional objects, structures, or any other electromagnetic energy-absorbing materials found in zone 9). Energy application zone 9 may also include loss constituents that do not, themselves, absorb an appreciable amount of electromagnetic energy, but otherwise account for electromagnetic energy losses. Such loss constitutes may include, for example, cracks, seams, joints, doors, interface between cavity and door, or any other loss mechanisms associated with energy application zone 9. Thus, in some embodiments, a load may include at least a portion of object 11 along with any electromagnetic energy-absorbing constituents in the energy application zone as well as any electromagnetic energy loss constituents associated with the zone.

FIGS. 1A and 1B are diagrammatic representation of an apparatus 100 for applying electromagnetic energy to an object.

Exemplary apparatuses 100 may be part of an oven (e.g., cooking oven), vending machine, chamber, tank, dryer (e.g., cloth dryer), thawer, dehydrator, reactor, engine, chemical or biological processing apparatus, furnace, incinerator, material shaping or forming apparatus, conveyor, combustion zone, cooler, freezer, etc.

Cavity 9 may be rectangular in shape (or any other suitable shape, such as cylindrical, semi-cylindrical, hemi-spherical cuboid, symmetrical, asymmetrical, irregular, regular, among others) and may be made of a conductor, such as aluminum, stainless steel or any suitable metal or other conductive material. In some embodiments, cavity 9 may include walls coated and/or covered with a protective coating, for example, made from materials transparent to electromagnetic energy, e.g., metallic oxides or others. Cavity 9 may be resonant in a predetermined range of frequencies (e.g., within the UHF or microwave range of frequencies, such as between 300 MHz and 3 GHz, or between 400 MHz and 1 GHZ). It is also contemplated that zone 9 may be closed, e.g., completely enclosed (e.g., by conductor materials), bounded at least partially, or open, e.g., having non-bounded openings. The general methodology of the invention is not limited to any particular cavity shape or configuration, as discussed earlier. While the invention is not limited to energy application zone of certain structure, each energy application zone mentioned herein may be resonant cavity, capable of supporting standing and/or semi-propagating waves at frequencies above a cutoff frequency.

In the presently disclosed embodiments, apparatus 100 may include a plurality of radiating elements. The radiating elements may be located on one or more surfaces of, for example, an enclosure defining the energy application zone. Alternatively, radiating elements may be located inside or outside the energy application zone. One or more of the radiating elements may be near, in contact with, in the vicinity of or even embedded in object 11 (e.g., when the object is a liquid). The orientation and/or configuration of each radiating element may be distinct or the same, based on the specific energy application, e.g., based on a desired target effect. Each radiating element may be positioned, adjusted, and/or oriented to emit electromagnetic waves along a same direction, or various different directions. Furthermore, the location, orientation, and configuration of each radiating element may be predetermined before applying energy to the object. Alternatively or additionally, the location, orientation, and configuration of each radiating element may be dynamically adjusted, for example, by using a processor, during operation of the apparatus and/or between rounds of energy application.

As shown in FIGS. 1A and 1B, apparatus 100 may include a plurality of radiating elements 2018 for delivery of electromagnetic energy to energy application zone 9. One or more of the radiating element(s) may also be configured to receive electromagnetic energy from energy application zone 9. In other words, radiating element, as used herein may function as an emitter, a receiver, or both, depending on a particular application and configuration. When a radiating element acts as a receiver of electromagnetic energy from an energy application zone (e.g., reflected electromagnetic waves), the radiating element may receive electromagnetic energy from the energy application zone.

As used herein, the term "radiating element" may broadly refer to any structure designed for the purposes of radiating or receiving energy, regardless of whether the structure serves any additional function. In some embodiments, a radiating element may include an antenna. For example, a radiating element may include an aperture/slot antenna, a monopole antenna, a loop antenna, a dipole antenna, an inverted F antenna, etc. In some embodiments, a radiating element may include a plurality of terminals emitting in unison, either at the same time or at a controlled dynamic phase difference (e.g., a phased array antenna). The radiating element may be an antenna, although the term antenna is usually used in the art in free space, and radiating elements, as used herein, serve a similar purpose in cavities, as well as in any other kind of energy application zone. Consistent with some exemplary embodiments, radiating element 2018 may include an electromagnetic energy emitter (referred to herein as "a emitting radiating element") that feeds energy into electromagnetic energy application zone 9, an electromagnetic energy receiver (referred herein as "a receiving radiating element") that receives energy from zone 9, or a combination of both an emitter and a receiver. An electromagnetic emitter may be supplied with RF energy, for feeding into the energy application zone, from an amplifier. An electromagnetic receiver may be connected to a detector configured to detect signals received by the receiver. A combination of a receiving and emitting radiating element may be connected both to an amplifier and to a detector. In some embodiments, a first radiating element may be configured to emit electromagnetic energy to zone 9, and a second radiating element may be configured to receive energy from the first radiating element. In some embodiments, one or more radiating elements may each serve as both receivers and emitters. In some embodiments, one or more radiating elements may serve a dual function while one or more other radiating elements may serve a single function. At times, in addition to or as an alternative to delivering and/or receiving energy, a radiating element may also be adjusted to affect the field pattern. For example, various properties of the radiating element, such as position, location, orientation, etc., may be adjusted. Different radiating element property settings may result in differing electromagnetic field patterns within the energy application zone thereby affecting energy absorption in the object. Therefore, radiating element adjustments may constitute one or more variables that can be varied for energy application control.

Consistent with the presently disclosed embodiments, energy supplied to an emitting radiating element is referred to herein as "incident energy". A portion of the incident energy may be dissipated in the object or absorbed by the object or by other loss constituents in the energy application zone. This portion of the incident energy may be referred to herein as "dissipated energy" or "absorbed energy". Another portion may be received by the radiating elements from the energy application zone. The received portion may include energy reflected back to the emitting radiating element (referred to herein as "reflected energy") and energy coupled to another one of the radiating elements (coupled energy). When coherent energy application is used, there is no way to differentiate between reflected energy and coupled energy, and use of received energy alone may be sufficient.

In certain embodiments, the application of electromagnetic energy may occur via one or more power feeds. A power feed may include one or more waveguides and/or one or more radiating elements for applying electromagnetic energy to the zone. Such radiating elements may include, for example, patch radiating elements, fractal radiating elements, helix radiating elements, log-periodic radiating elements, spiral radiating elements, slot radiating elements, dipole radiating elements, loop radiating elements, slow wave radiating elements, leaky wave radiating elements or any other structures capable of emitting and/or receiving electromagnetic energy.

The invention is not limited to radiating elements having particular structures or locations. Radiating elements may be polarized in differing directions in order to, for example, reduce coupling, enhance specific field pattern(s), increase the energy delivery efficiency and support and/or enable a specific algorithm(s). Any suitable number of radiating elements (such as two, three, four, five, six, seven, eight, etc.) may be used—e.g., three radiating elements may be placed parallel to orthogonal coordinates. A higher number of radiating elements may add flexibility in system design and improve control of energy distribution, e.g., greater uniformity and/or resolution of energy application in zone 9.

Figure 2:
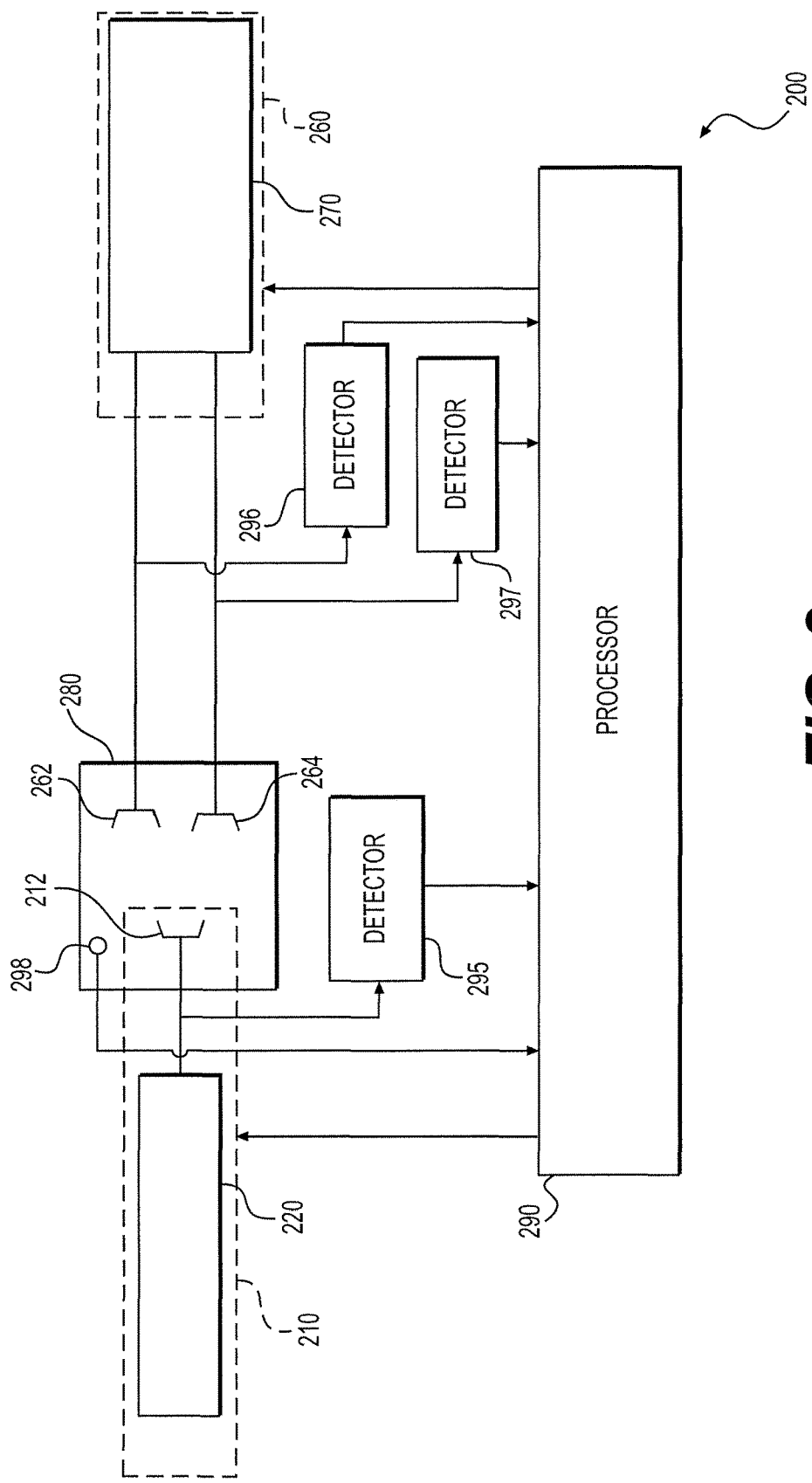
FIG. 2 is a diagrammatic representation of an apparatus for applying electromagnetic energy to an object, in accordance with some exemplary embodiments of the present invention.

FIG. 2 is a diagrammatic illustration of an apparatus 200 according to some embodiments of the invention. Apparatus 200 may include one or more energy application units 210, 260. An energy application unit may include one or more radiating elements (212, 262, 264) and an RF energy source (220, 270) configured to supply RF energy to the radiating element(s). Energy application zone 280 may or may not be included as part of apparatus 200. Each RF energy source may be structured similarly to source 2010 shown in FIG. 1A or 1B. In some embodiments, an energy application unit may include two or more synchronized RF energy sources, which may be controlled to feed the radiating elements with signals having a common frequency, a controlled phase difference, and/or a controlled amplitude difference, etc. In some energy application units, radiation originating in the same source may be split, and modulated in phase and/or amplitude to supply to the energy application zone signals with controlled phase and/or amplitude differences. In some embodiments, the apparatus may include more than one source of electromagnetic energy, and/or more than one energy application unit. For example, more than one oscillator may be used for generating AC waveforms of differing frequencies. In some embodiments, for example, when two energy application units apply energy at mutually different frequencies, energy may be applied from each of the energy application units individually (i.e., one at a time) or, alternatively, energy may be applied concurrently from two or more of the energy application units, with the same or similar processing effects. In some embodiments, for example, when two energy application units apply energy coherently with each other, they may have the effect of a single energy application unit, with the number of radiating elements given by the sum of the numbers of the radiating elements included in each of the energy application units. Therefore, a similar discussion may be relevant both to apparatuses including one energy application unit and to apparatuses including a plurality of energy application units, and the invention may be implemented irrespective of the number of energy application units included in the apparatus. An energy application unit may be controlled by a processor 290. For example, processor 290 may set the value of each controllable field affecting parameter (c-FAP, e.g., frequency, phase combination, and/or amplitude combination) to define excitation setups at which energy may be applied to energy application zone 280. In some embodiments, processor 290 may control the energy application units based on input the processor receives from detectors 295, 296, and 297. Each of detectors 295, 296, and 297 may receive electromagnetic feedback from one of radiating elements 212, 262, and 264, respectively. The detectors may include, for example, power meters, field sensors, samplers (e.g., directional couplers). In some embodiments, a single detector may be used, and it may detect feedback from another one of the radiating elements at a time, for example, by a suitable time division arrangement. In some embodiments, processor 290 may control the energy application units based on input the processor receives from sensors, e.g., sensor 298. The sensors may be used to sense any information, including, for example, electromagnetic power, temperature, weight, humidity, motion, etc. The sensed information may be used for any purpose, including process control, verification, automation, authentication, safety, etc.

An energy application unit according to some embodiments (e.g., each of units 260 and 270) may be set, e.g., by processor 290, to apply energy at two or more different excitation setups. Applying energy at different excitation setups may result in excitation of different field patterns in the energy application zone. The excitation setups may differ from one another by one or more values of parameters that may affect the field pattern and may be controlled by components of the apparatus. Such a parameter is referred to herein as a c-FAP (controllable field affecting parameter). In some embodiments, a value may be selected for each c-FAP, and the excitation setup may be defined by the selected values. Varying a selected value of even one c-FAP varies the excitation setup, which, in turn, may vary the field pattern excited in the energy application zone. It is noted that when an excitation setup includes energy application through a plurality of radiating elements together, all the radiating elements apply energy at the same frequency. If two radiating elements concurrently apply energy at two different frequencies these may be considered as two excitation setups applied concurrently, and not as a single excitation setup.

In some cases, varying values of c-FAPs may result in significant variations in the excited field patterns. In other instances, however, varying values of c-FAPs may produce little or no change in the excited field patterns (e.g., if the variation between the two values of the c-FAP is small).

Applying energy at a particular excitation setup may excite an electromagnetic field pattern in the energy application zone. For brevity, this excited electromagnetic field pattern may be referred to as an excitation. Thus, each excitation setup may correspond to an excitation; and a reference to a supply, reception, absorption, leakage, etc. of an excitation setup may refer to a supply, reception, absorption, leakage, etc. of the corresponding excitation. Thus, for example, a statement that a given excitation or excitation setup is absorbed in the object may mean that energy associated with an electromagnetic field excited by the energy application unit at the given excitation setup is absorbed in the object.

Various apparatuses may allow the control of different field affecting parameters. For example, in some embodiments, an apparatus may include a processor that controls the frequency of an electromagnetic wave applied by an energy application unit to the energy application zone. In such apparatuses, the frequency may be available as a c-FAP. In one example, such an apparatus may control the frequency to have any of two or more values, e.g. 800 MHz, 800.5 MHz, 900 MHz, 2400 MHz, etc. By controlling the frequency and changing from one frequency value to another, the excitation setup may be changed, which, in turn, may change an electromagnetic field pattern excited in the energy application zone.

In another example, an energy application unit may include two radiating elements that emit radiation at a controllable phase difference. The phase difference may be controlled to have two or more values, e.g., 0°, 90°, 180°, or 270°. The phase difference between electromagnetic fields emitted by the two radiating elements may be available to the apparatus comprising the energy application unit as a c-FAP. In some embodiments, more than two radiating elements may be provided, and a phase difference between each two of them may constitute a c-FAP. In some embodiments, the values of all such c-FAPs collectively (e.g., 90° between radiating element 1 and 2, 150° between radiating element 2 and 3, and so on) may be referred to as a phase relation. A phase difference between two radiating elements may include a specific case of a phase relation, for example, when only two radiating elements are involved. A phase relation between n antennas may include up to n−1 phase differences, each of which may, in principle, be set independently of the other phase differences.

In another example, a difference between intensities at which two radiating elements emit electromagnetic fields of the same frequency may be controlled, and thus may be available as a c-FAP. In some embodiments, more than two radiating elements may be provided, and an intensity difference (also referred to herein as an amplitude difference) between each two of them may constitute a c-FAP. In some embodiments, the values of all such c-FAPs collectively (e.g., power supplied to radiating element No. 2 is half that supplied to radiating element No. 1, power supplied to radiating element No. 3 is 0.3 that supplied to radiating element No. 1, and so on) may be referred to as an amplitude relation. An amplitude relation between n antennas may include up to n−1 amplitude differences or ratios, each of which may, in principle, be set independently of the other amplitude differences or ratios.

Excitation setups including only a single c-FAP may be referred to as one-dimensional excitation setups. An excitation setup including multiple c-FAPs may be referred to as a multi-dimensional excitation setup. For example, an apparatus comprising two radiating elements, where the phase difference between them is controllable in addition to controllability of the frequency may be configured to generate two-dimensional excitation setups. The collection of all the excitations that may be excited by an apparatus (or the collection of all the excitation setups available to an apparatus) may be referred to as the excitation space of the apparatus. The dimension of an excitation space of an apparatus may be the same as the dimension of each excitation setups available to that apparatus.

In some embodiments, an energy application unit may be controlled by a processor configured to control energy application in accordance with feedback. The feedback may be indicative, for example, of the temperature, weight, position, volume, or any other characteristic of the object. Additionally, or alternatively, the feedback may include electromagnetic feedback.

As used herein, electromagnetic (EM) feedback may include any received signal or any value calculated based on one or more received signals, which may be indicative of the dielectric or electrical response of the cavity and/or the object to electromagnetic fields excited in the cavity. For example, electromagnetic feedback may include any signal that may be indicative of a scattering parameter of a system comprising the energy application zone and the object. Such a system is referred to herein as a cavity-object system. For example, electromagnetic feedback may include input and output power levels, network parameters, e.g., S parameters, Y parameters, reflection and transmission coefficients, impedances, etc, as well as values derivable from them. Examples of derivable values may include dissipation ratios (discussed below), time or excitation setup derivatives of any of the above, etc. Electromagnetic feedback may be excitation-dependent and may, for example, include signals, the values of which may vary over different excitation setups. In some embodiments, electromagnetic feedback, measured when energy is applied at various excitation setups, may be used for controlling energy application.

Returning to FIGS. 1A and 1B, the figures provide diagrammatic representations of exemplary apparatuses 100 for applying electromagnetic energy to an object, in accordance with some embodiments of the present invention.

In some embodiments, apparatus 100 may involve the use of at least one source 2010 configured to supply electromagnetic energy to the energy application zone. By way of example, and as illustrated in FIG. 1A, the source may include one or more of an RF power supply 2012 configured to generate electromagnetic waves (also referred to herein as AC waveforms) that carry electromagnetic energy. For example, power supply 2012 may be a magnetron configured to generate high power microwave waves at a predetermined wavelength or frequency. In some embodiments, power supply 2012 may include a semiconductor oscillator, such as a voltage controlled oscillator, configured to generate AC waveforms (e.g., AC voltage or current). In some embodiments, a source of electromagnetic energy may include any other power supply, such as electromagnetic field generator, electromagnetic flux generator, direct digital synthesizer (DDS) or any mechanism for generating vibrating electrons.

The frequency of the waveform may be controllable, for example, by a frequency control signal sent to the RF power supply from the at least one processor. Similarly, a phase difference between waveforms emitted by two or more of the radiating elements may be controlled. The control may be by one or more phase control signals, sent from the at least one processor to the source, to source 2010 or to a component therein. For example, phase control signals may be sent to phase modulator 2014 or to RF power supply 2012, for example, if the RF power supply controls the phase of a waveform it supplies, as in the case of a DDS. In some embodiments, amplitude ratio between amplitudes of waveforms emitted by two or more of the radiating elements may be controlled. The control may be by way of one or more control signals sent from processor 2030 to source 2010 or to one or more components thereof, for example, to amplifiers 24 and 28 (FIG. 1B). In some embodiments, the RF power supply may control the amplitude of the signals it generates (e.g., a DDS), and the amplitude control signals may include signals sent to the RF power supply. The control signals may go through control lines, like those marked in FIG. 1B as arrows going from processor 2030 to oscillator 22, phase shifter 54 and amplifiers 24 and 28.

In accordance with some embodiments, apparatus 100 may include at least one processor 2030. As used herein, the term "processor" may include an electric circuit that performs a logic operation on input or inputs. For example, such a processor may include one or more integrated circuits, microchips, microcontrollers, microprocessors, all or part of a central processing unit (CPU), graphics processing unit (GPU), digital signal processors (DSP), field-programmable gate array (FPGA) or other circuit suitable for executing instructions or performing logic operations. The instructions executed by the processor may, for example, be pre-loaded into the processor or may be stored in a separate memory unit such as a random access memory (RAM), a read-only memory (ROM), a hard disk, an optical disk, a magnetic medium, a flash memory, other permanent, fixed, or volatile memory, or any other mechanism capable of storing instructions for the processor. The processor(s) may be customized for a particular use, or can be configured for general-purpose use and can perform different functions by executing different software.

If more than one processor is employed, all may be of similar construction, or they may be of differing constructions electrically connected or disconnected from each other. They may be separate circuits or integrated in a single circuit. When more than one processor is used, they may be configured to operate independently or collaboratively. They may be coupled electrically, magnetically, optically, acoustically, mechanically or by other means permitting them to interact. Processor 2030 may regulate modulations performed by modulator 2014. In some embodiments, modulator 2014 may include at least one of a phase modulator and/or an amplitude modulator. In some embodiments, the amplitude modulator may include an amplifier 2016 configured to control the amplitude of the signal supplied to the radiating element. In some embodiments, a phase modulator may include a splitter and a phase shifter, for example, as shown in FIG. 1B. In some embodiments, the signals may be generated by a direct digital synthesizer (DDS), which may include frequency, phase, and amplitude modulators. Phase modulator (e.g., modulator 2014) may be controlled to perform a predetermined sequence of time delays on an AC waveform, such that the phase of the AC waveform is increased by a number of degrees (e.g., 10 degrees) for each of a series of time periods. In some embodiments, processor 2030 may dynamically and/or adaptively regulate such phase modulation based on feedback from the energy application zone.

In FIG. 1B, modulator 2014 may accomplish phase modulation using, e.g., splitter 52 and phase shifter 54. Splitter 52 may be configured to split a signal generated by oscillator 22 into two split signals. Phase shifter 54 may be configured to shift the phase of one of the split signals. The phase shifter may be controllable, for example by a phase control signal arriving from processor 2030. In some embodiments, the phase shifter may be configured to cause a time delay in the AC waveform in a controllable manner, delaying the phase of an AC waveform anywhere from between 0-360 degrees. Thus, the processor may determine a phase difference between signals applied by the two radiating elements 2018, and control the phase shifter accordingly. In some embodiments, phase difference between signals supplied to two or more radiating elements may be obtained directly from the RF source—for example: the output frequency and the phase emitted from each radiating element may be determined by the source (for example, by using a Direct Digital Synthesizer).

Processor 2030 may be configured to regulate the phase modulator, e.g., by sending a phase control signal to phase modulator 2014 in order to alter a phase difference between two electromagnetic waves supplied to the energy application zone. In some embodiments, source 2010 may be configured to supply electromagnetic energy in a plurality of phase relations, and the processor may be configured to cause the transmission of energy at a subset of the plurality of phase relations. The phase relations at which energy is applied may be selected by processor 2030 based on dissipation ratios (or other quality indicators) calculated or measured for various phase relations. For example, processor 2030 may select for application phase relations associated with the highest dissipation ratios, with dissipation ratios that are within a predetermined range, etc.

The processor may be configured to regulate an amplifier in order to alter an amplitude of at least one electromagnetic wave supplied to the energy application zone. In FIG. 1B, amplitude modulation may be accomplished by amplifiers 24 and 28, each of which amplifying one of the split signals. Amplifiers 24 and 28 may each have a controllable gain. For example, the gain of each of them may be controlled independently by a gain control signal arriving from processor 2030. Thus, the processor may determine an amplitude (or intensity, or power) difference (or ratio) between signals applied by the two radiating elements 2018, and control the amplifiers accordingly.

Processor 2030 may be configured to regulate an oscillator (which may form part of RF power supply 2012) to sequentially generate AC waveforms oscillating at various frequencies within one or more predetermined frequency bands. In some embodiments, a predetermined frequency band may include a working frequency band, and the processor may be configured to cause the transmission of energy at frequencies within a sub-portion of the working frequency band. In some embodiments, based on the feedback signal provided by detector 2040, processor 2030 may be configured to select one or more frequencies or sub-bands from a frequency band, and regulate an oscillator to sequentially generate AC waveforms at these selected frequencies.

Although FIGS. 1A and 1B illustrate circuits, each including two radiating elements 2018, it should be noted that any number of radiating elements may be employed, and the processor may select combinations of excitation setups through selective use of radiating elements. By way of example only, in an apparatus having three radiating elements A, B, and C, the processor may choose applying energy at excitation setups employing radiating element A alone, radiating elements A and B while C does not emit, simultaneously emitting from all the radiating elements, etc. Each radiating element 2018 may receive energy from an amplifier (24 or 28) and from cavity 9. The signals may go through couplers (e.g., dual directional couplers 34 and 38 illustrated in FIG. 1B), configured to direct signals coming from the amplifiers to the radiating elements, and signals coming from the cavity to detector 2040. In some embodiments, a circulator (not illustrated) may be provided between the amplifier and the radiating element to direct reflected power from the radiating element to a dummy load.

One or more processors may be configured to cause electromagnetic energy to be applied to zone 9 via a plurality of radiating elements, for example across a series of excitation setups, in order to apply electromagnetic energy to object 11 at each of the excitation setups. For example, the at least one processor may be configured to regulate one or more components of apparatus 100 (e.g., oscillator 22, phase shifter 54, amplifier 24 and/or amplifier 28), in order to cause the energy to be applied at excitation setups selected from the excitation space of apparatus 100. In some embodiments, for example, processor 2030 may regulate a source (e.g., source 2010 of FIG. 1A or FIG. 1B) to apply energy at excitation setups that include applying energy through two or more radiating elements at overlapping time periods at the same frequency and at differing phase relations and/or at differing amplitude relations.

In certain embodiments, the at least one processor may be configured to determine a quality indicator—for example: a value indicative of energy absorbable by the object at each of a plurality of excitation setups. This may occur, for example, using one or more lookup tables, by pre-programming the processor or memory associated with the processor, and/or by testing an object in an energy application zone to determine its absorbable energy characteristics. One exemplary way to conduct such a test is through a sweep.

As used herein, a sweep may include, for example, the transmission over time of energy at more than one excitation setups. For example, during an excitation setup sweeping process, the at least one processor may regulate the energy supplied to the at least one radiating element to sequentially deliver electromagnetic energy at various excitation setups to zone 9, and to receive feedback which serves as an indicator of the energy absorbable by object 11.

During the sweeping process, RF source 2010 may be regulated by processor 2030 based on electromagnetic feedback detected by detector (e.g., detector 2040 illustrated in FIG. 1A or 1B). Processor 2030 may then determine a value indicative of energy absorbable by object 11 at each of a plurality of excitation setups based on the received feedback. In some embodiments, certain excitation setups may be swept, and based on the feedback received therein, energy absorbable values may be calculated for other excitation setups. For example, in some embodiments, S parameters may be measured during a sweep for various frequencies, each transmitted by one of the radiating elements at a time. These S parameters may be used for calculating dissipation ratios or other values indicative of energy absorbable in the object at excitation setups. The S parameters may be used in this manner in situations including concurrent energy application by two or more of the radiating elements at the same frequencies, at given phase relations and/or particular amplitude relations. In another example, gamma parameters may be measured at certain excitation setups, and these may be used for calculating S parameters. In turn, the calculated S parameters may be used for calculating gamma parameters, dissipation ratios, or other parameters indicative of energy absorbable in the object at other excitation setups.

Consistent with some of the presently disclosed embodiments, a value indicative of the absorbable energy may include a dissipation ratio (referred to herein as "DR"). A dissipation ratio value may be associated with each of a plurality of excitation setups. As referred to herein, a "dissipation ratio" (or "absorption efficiency" or "heating efficiency"), may be defined as a ratio between electromagnetic energy (or power) absorbed by (or dissipated in) energy application zone 9 with object 11 therein, and electromagnetic energy supplied to radiating elements 2018.

Energy that may be dissipated or absorbed by the energy application zone with an object therein is referred to herein as "absorbable energy" or "absorbed energy". Absorbable energy may be an indicator of the object's capacity to absorb energy or the ability of the apparatus to cause energy to dissipate in a given object (for example—an indication of the upper limit thereof). In some of the presently disclosed embodiments, absorbable energy may be calculated as a product of the incident energy (e.g., maximum incident energy) supplied to the at least one radiating element and the dissipation ratio. Received energy (e.g., the energy supplied to the radiating element and not absorbed) may, for example, be a value indicative of energy absorbed by the object. By way of another example, a processor might calculate or estimate absorbable energy based on the portion of the incident energy that is not received back from the energy application zone That estimate or calculation may serve as a value indicative of absorbed and/or absorbable energy. When energy is applied through several radiating elements at the same frequency and at overlapping time periods it may be practically impossible to distinguish between energy reflected back to, for example, radiating element No. 1, and energy coupled to radiating element No. 1 that originates in radiating element No. 2. Thus, in such cases, the dissipated energy may be determined as a difference between the total incident energy supplied to all the radiating elements and the total received energy, received by all the radiating elements. It is noted that in other cases, for example, when one radiating element transmits at a time, a dissipation value may be assigned to each of the radiating elements, while in the present case, where radiating elements transmit concurrently at a common frequency, there may be one dissipation value common to all the radiating elements.

During an excitation setup sweep, the at least one processor may be configured to control a source of electromagnetic energy such that energy is sequentially applied at a series of excitation setups. The at least one processor may then receive a signal indicative of energy received at each radiating element when energy is applied at each excitation setup. Using a known amount of incident energy supplied to the radiating element and a known amount of energy received back from the energy application zone, an absorbable energy indicator may be calculated or estimated. Alternatively, the processor might simply rely on an indicator of reflection and/or transfer coefficients as a value indicative of absorbable energy.

In some of the presently disclosed embodiments, a dissipation ratio may be calculated using formula (1), (1A), or (1B):

$$DR = P_{abs}/P_{in} \tag{1}$$

$$DR = (P_{in} - P_{rf} - P_{cp})/P_{in} \tag{1A}$$

$$DR = (P_{in} - P_{received})/P_{in} \tag{1B}$$

where $P_{in}$ represents the electromagnetic energy and/or power supplied to radiating elements 2018, $P_{abs}$ represents the electromagnetic energy and/or power absorbed by the object, $P_{rf}$ represents the electromagnetic energy reflected/returned at those radiating elements that function as emitters, $P_{cp}$ represents the electromagnetic energy coupled at those radiating elements that function as receivers, and $P_{received}$ represents the total energy and/or power received by the radiating elements. Equation 1A may be derived from equation 1 under the assumption that all energy or power that is neither reflected back to the emitting radiating element nor coupled to a receiving radiating element is absorbed by the object. DR may be a value between 0 and 1, and thus may be represented by a percentage number. The DR defined in formula (1A) may differ between radiating elements. The DR defined in formula (1B) may be suitable for use with excitation setups that include concurrent energy application at a common frequency from a plurality of radiating elements, and may be associated with the system as a whole, and not with a particular radiating element. In all cases, however, the DR may have a value between 0 and 1, and can be expressed as a percentage ratio.

For example, consistent with some embodiments which include three radiating elements, (e.g., 262, 264, and 212) indexed with indexes 1, 2, and 3, a processor (e.g., processor 2030 or 290) may be configured to determine input reflection coefficients $S_{11}$, $S_{22}$, and $S_{33}$ and the transfer coefficients may be $S_{12}=S_{21}$, $S_{13}=S_{31}$, $S_{23}=S_{32}$ based on a measured power and/or energy information during the sweep. Accordingly, the dissipation ratio DR corresponding to radiating element 1 may be determined based on the above mentioned reflection and transmission coefficients, according to formula (2):

$$DR_1 = 1 - (|S_{11}|^2 + |S_{12}|^2 + |S_{13}|^2). \tag{2}$$

In some embodiments, a common DR may be defined for the two radiating elements, for example, as provided in equations 3.1 and 3.2:

$$DR^{1+2} = P_{abs}/(P_{in}^1 + P_{in}^2) \tag{3.1}$$

$$DR^{1+2} = [(P_{in}^1 + P_{in}^2) - (P_{out}^1 + P_{out}^2)]/(P_{in}^1 + P_{in}^2) \tag{3.2}$$

wherein the $P_{in}^1$ and $P_{in}^2$ are the power (or energy) incident at radiating element 1 and 2, respectively; and $P_{out}^1$ and $P_{out}^2$ are the power (or energy) received at radiating element 1 and 2, respectively. The common DR may be particularly useful when energy is applied by two or more radiating elements simultaneously, e.g., at a controlled phase-relation.

For example, equations 3.1 and 3.2 may be useful, where radiating elements 1 and 2 concurrently apply energy at the same frequency. It is noted, however, that this DR (which may be referred to herein as coherent DR) may be calculated from S parameters, but not by formula (2). For calculating coherent DR, the complex values of the S parameters may be required, and also the knowledge of the phase and amplitude differences at which energy is applied through radiating elements 1 and 2. A method for calculating coherent DR based on S parameters is provided below.

Absorbable energy values may be used, for example, for setting energy application parameters. For example, an amount of energy applied at each excitation setup, time duration of energy application at each excitation setup (also referred to as transmission duration), and/or power level at which energy is applied at each excitation setup may be set. For example, the energy application parameters may be set based on, e.g., a function of one or more quality indicators—e.g., absorbable energy values. In some embodiments, the setting may be accomplished by at least one processor, e.g., processor 2030 or 290.

The energy supplied to at least one radiating element 2018 at each of the excitation setups may be determined as a function of the absorbable energy value at each excitation setup (e.g., as a function of a dissipation ratio, input impedance, a combination of the dissipation ratio and the input impedance, or some other indicator). In some embodiments, the energy applied to the zone at each excitation setup may be determined based on or in accordance with electromagnetic feedback obtained during an excitation setup sweep. That is, using the electromagnetic feedback, the at least one processor may adjust energy applied at each excitation setup such that the energy at a particular excitation setup may in some way be a function of an indicator of absorbable energy (or other electromagnetic feedback) associated with that excitation setup. The invention may encompass any technique for controlling the energy applied by taking into account an indication of absorbable energy.

Because absorbable energy can change based on a host of factors including object temperature, in some embodiments it may be beneficial to regularly update absorbable energy values (e.g., during object processing) and adjust energy application based on the updated absorbable values. These updates can occur multiple times a second, or can occur every few seconds or longer, depending on the requirements of a particular application.

As mentioned, an aspect of some embodiments of the invention may include a method of processing an object in an energy application zone by application of RF energy. In some embodiments, the processing may include RF energy applications in two or more cycles. The cycles may be organized in pairs, such that the first cycle in each pair may be used for applying a small amount of energy (e.g., through excitation setup sweep) and receiving feedback in response to the energy application; and the second cycle in each pair may be used for applying RF energy in an amount sufficient to process the object. The energy applied during the second cycle may be based on or adjusted in accordance with the received feedback. The first cycle may include energy application at a first plurality of excitation setups. In the second cycle, RF energy may be applied at one or more excitation setups that may be selected based on the feedback, e.g., from excitation setups available to the apparatus used for the processing. Energy application at the selected one or more excitation setups may be based on energy application parameters (e.g., time duration and/or power level) selected based on the feedback.

In some embodiments, the second cycle in a pair may include energy application at one or more excitation setups not included in the first cycle in the pair. This way, in some embodiments, energy application parameters may be selected for an excitation setup based on feedback received in response to RF energy applied at other excitation setups only. In some embodiments, only excitation setups that did not take place in the first cycle may be selected for the second cycle. For example, where in the first cycle each radiating element emits at a different time period, and in the second cycle, at one or more of the excitation setups, two or more radiating elements may emit at overlapping time periods. In another example, in some embodiments, gamma parameters may be measured at some phase relations during the first cycle, and one or more excitation setups of other phase relations may be selected for application in the second cycle.

In some embodiments, absolute values of reflection coefficients ($|\Gamma|^2$) may be measured at a certain number of excitation setups that differ from each other in phase relations between radiations emitted by two or more power feeds. The reflection coefficients may be used for calculating EM feedback (e.g., values indicative of energy absorbed in the object) at other phase relations, for example, using a method described in detail herein.

In another example, the first cycle may include: energy application via a single radiating element at any given time, and measurement of complex S parameters (each associated with one emitting radiating element), while energy is not applied through the other radiating elements. These complex S parameters may be used for calculating S parameters and/or absorption efficiencies, and/or values of any other EM feedback parameter, at each arbitrary phase relation between radiations emitted by two or more of the radiating elements at overlapping time periods. These calculated values may be used in selecting excitation setups and/or in determining energy application parameters at excitation setups, including excitation setups not included in the first cycle, for example, excitation setups that include energy application by two or more of the radiating elements at overlapping time periods.

In some embodiments, the average amount of energy applied per excitation setup in a first cycle in a pair of cycles may be smaller than the average amount of energy applied per excitation setup in the second cycle in the pair. For example, an average power level, at which energy is applied per excitation setup may be higher during the second cycle than during the first cycle. For example, if energy is applied via a single radiating element at a time during a first cycle, and via four radiating elements during overlapping time periods in the second cycle, the average power level applied during the second cycle may be larger than during the first cycle. Average energy applied per excitation setup at a first cycle may be smaller than that applied at a second cycle by a factor of, for example, 2, 4, 5, 10, 50, 100, 500, or any intermediate number. The same principle may be applied also with other numbers of radiating elements. Furthermore, in some embodiments, more energy may be supplied to each radiating element in the second cycle than in the first, such that the total amount of energy applied per excitation setup may exceed the above-mentioned ratios between power levels.

Additionally, or alternatively, an average time duration, during which energy is applied per excitation setup, may be longer during the second cycle than during the first cycle. The ratio between average time duration in a second and first cycle of the same pair may be, for example, 2, 4, 50, 10, 50, 100, 500, or any intermediate or larger ratio.

An aspect of some embodiments of the invention may include an apparatus for processing an object with RF energy. The object may be in an energy application zone, to which RF energy is applied. The apparatus may include an energy application unit, a detection unit, and a controller. The latter may include at least one processor. The terms controller, processor, and at least one processor, are used herein interchangeably. The energy application unit may be configured to apply to the energy application zone RF energy at a plurality of excitation setups. The detection unit may be configured to detect electromagnetic feedback from the energy application zone, and the controller may be configured to associate electromagnetic feedback received from the detection unit with the excitation setups, in response to which the feedback was received. The terms detector and detection unit are used herein interchangeably. The controller may further be configured to cause application of energy by the energy application unit in a second cycle, based on feedback detected by the detection unit in the first cycle. In some embodiments, the controller may be configured to cause the application of energy in the second cycle at one or more excitation setups not included in the first cycle.

It may be noted, that in some embodiments, one or more, or even all the radiating elements used in the first cycle may be used in the second cycle. For example, there may be four radiating elements, each radiating separately in the first cycle, and all radiating together (e.g., at a controlled phase relation between them) at the second cycle.

In some embodiments, the detection unit may be configured to receive feedback from a single radiating element at any given time. In some such (and other) embodiments, the controller may be configured to cause application of RF energy at two or more radiating elements during overlapping time periods, for example, to cause application of RF energy at an excitation setup characterized by a given phase relation between radiations emitted via two or more of the radiating elements.

In some embodiments, the processor may be configured to determine absorption efficiencies (and/or other EM feedback related values) at a second plurality of excitation setups that may include excitation setups not included in the first cycle. The second cycle may then include excitation setups selected from the plurality of excitation setups available to the apparatus.

For example, the first cycle may include energy application at a given frequency via a single radiating element at a time, and based on S parameters obtained from feedback received during the first cycle, absorption efficiencies may be calculated for excitation setups that include energy application at the given frequency via two or more radiating elements at overlapping time periods. The second cycle may include energy application at the given frequency via two or more radiating elements at overlapping time periods at a phase relation. The second cycle may also include excitation setups, for which absorption efficiencies were calculated. In another example, the first cycle may include energy application via two or more radiating elements at overlapping time periods, at a common frequency, and at a certain phase relation between radiations emitted by each of the two or more radiating elements. Absorption efficiencies may then be calculated based on feedback received during the first cycle, for excitation setups not applied during the first cycle. One or more of these excitation setups may be selected for application during the second period, and thus, one or more of the excitation setups used in the second cycle may include energy application at some other phase relations, not included in the first cycle. In both examples, the second cycle may also include energy application at one or more of the excitation setups, used during the first cycle.

In some embodiments, the absorption efficiencies may be analytically calculated based on measured values. For example, absorption efficiencies may be analytically calculated for certain phase relations based on S parameters measured when energy was applied via one radiating element at a time, and no phase relations existed. In another example, absorption efficiencies at certain phase relations may be analytically calculated based on gamma parameters measured at other phase relations. A target parameter (e.g., absorption efficiency) may be analytically calculated for an excitation setup based on measured values (e.g., values of S or gamma parameters), and regardless of the absorption efficiencies calculated for other excitation setups. Analytical calculation may differ from interpolation or extrapolation in which target parameters at some excitation setups may be calculated based on values of target parameters calculated for other excitation setups.

In some embodiments, one or more of the feedback parameters may be indicative of a difference between phases of two signals such as, for example, a difference between phase of forward voltage and phase of a backward voltage. In some embodiments, the detection unit may include one or more components configured to detect a phase difference between two signals. The phase of the forward parameter (e.g., the phase of a forward voltage), the phase of a backward parameter (e.g., the phase of a backward voltage), and the difference between such phases, etc., may each constitute a feedback parameter. Detecting a phase of a feedback parameter may include extracting from the feedback signal information on a phase of the feedback signal and/or sending to the controller such information or a signal indicative of such information. Phase-related information may be useful in computing feedback values associated with excitation setups not included in the first cycle. For example, the detector may be configured to extract information regarding magnitude and phase of an S parameter (measured with energy being applied at a given frequency via one radiating element while all the other radiating elements function only as receivers at the given frequency), and these may be used in calculating energy absorption efficiencies associated with various phase relations between radiations emitted from two or more radiating elements at the given frequency at overlapping time periods.

In some embodiments, however, the detection unit may be sensitive mainly to the amplitude of the signal or to a ratio between amplitudes of signals such as, e.g., a ratio between the absolute value of a forward voltage and the absolute value of a backward voltage. A detection unit of this kind may be configured to provide information only regarding the amplitude of the feedback signals, and may be non-sensitive to phase of a detected signal and/or may be configured not to send to the controller information regarding phase of the signal; or the controller may be configured not to receive information concerning the phase or not to base its operation on the phase, if received from the detection unit. Information relating to absolute values of feedback signals may be embodied in real (as opposed to complex) values. In some such embodiments, the controller may be configured to use such real values (and in some cases, no complex or phase values) in computing energy absorption efficiencies associated with excitation setups not included in the first cycle. For example, in some embodiments, the first cycle may include energy application at excitation setups that include energy application via two or more radiating elements at overlapping time periods, and the detector may extract from the feedback information including absolute (real) values of reflection coefficients, and substantially no information regarding the phases of the reflection coefficients. These real values may be used in determining energy absorption efficiencies at excitation setups that are not included in the first cycle, for example, excitation setups that include energy application at phase relationships other than those included in the first cycle.

Figure 3:
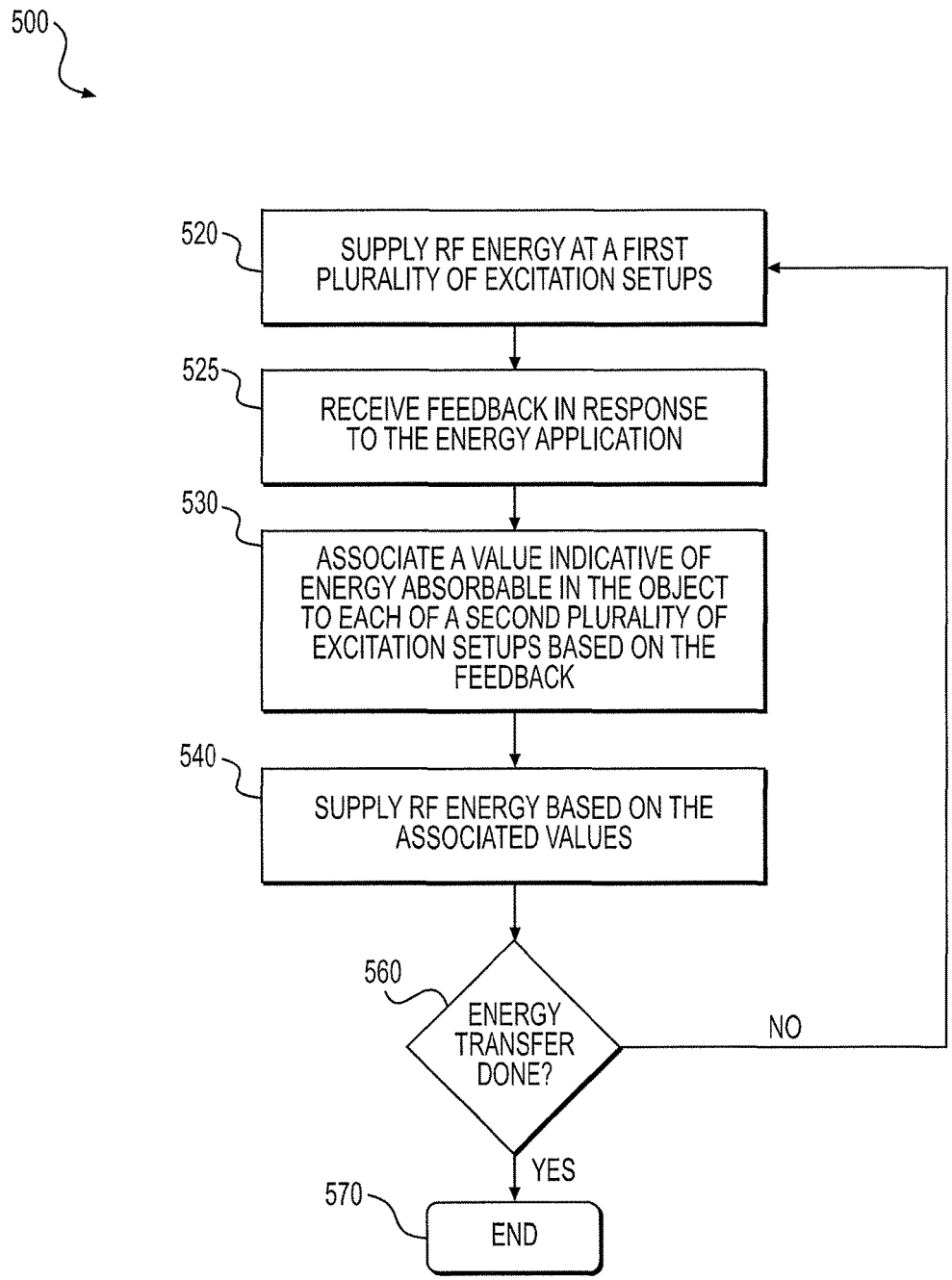
FIG. 3 is a flow chart of a method for applying electromagnetic energy to an energy application zone in accordance with some embodiments of the present invention.

FIG. 3 represents a method for applying electromagnetic energy to an object in accordance with some embodiments of the present invention. Electromagnetic energy may be applied to an object, for example, through at least one processor (e.g., processor 2030 or 290) implementing a series of steps of method 500 of FIG. 3.

In certain embodiments, method 500 may involve controlling a source of electromagnetic energy. A source of electromagnetic energy may also be referred to herein as a "source". By way of example only, in step 520, the at least one processor may control an energy application unit and/or RF energy source (for example, source 2010 (shown in FIG. 1A or 1B).

The source may be controlled to supply RF energy at a first plurality of excitation setups (e.g., at a plurality of frequencies and/or phase combinations and/or amplitude combinations etc.) to at least one radiating element, as indicated in step 520. Various examples of excitation setup supply, including sweeping, as discussed earlier, may be implemented in step 520. Alternatively or additionally, other schemes for controlling the source may be implemented so long as that scheme results in the supply of energy at a plurality of excitation setups. In some embodiments, the amount of energy supplied during step 520 may be small enough not to cause a detectable change in the properties of the object. This may be accomplished, for example, by applying energy at low power levels and/or for short durations. The power levels and time durations may be low and short, for example, in comparison to power levels and time durations used during execution of step 540, discussed below.

In some embodiments, method 500 may include step 525, in which feedback may be received from the energy application zone in response to the energy application at step 520. The feedback may include electromagnetic feedback. A value of a feedback parameter may vary between from one excitation setup to another, in which case, the feedback may be referred to as excitation setup dependent, and may be received during an excitation setup sweep.

In certain embodiments, the method may further involve associating absorption efficiencies and/or other values indicative of energy absorbable by the object to each of a second plurality of excitation setups, in step 530. In some embodiments, the value may be associated with an excitation setup based on feedback received in step 525. In some embodiments, a value indicative of energy absorbable in the object (also referred to herein as an absorbability indicator or AI) may be associated with a certain excitation setup based on feedback received in response to energy application at one or more other excitation setups. An absorbable indicator may include any indicator—whether calculated, measured, derived, estimated or predetermined—of an object's capacity to absorb energy. For example, the processor may be configured to determine an absorbable energy value, such as dissipation ratio, for each excitation setup of the second plurality, and associate the determined value with the excitation setup for which the value was determined. In some embodiments, the second plurality of excitation setups may include one or more excitation setups not included in the first plurality of excitation setups, at which energy is supplied in step 520.

In certain embodiments, method 500 may also involve step 540, in which an amount of RF energy is supplied at one or more excitation setups based on the absorbable energy value associated to each of the excitation setups of the second plurality in step 530. For example, in step 540, the processor may determine an amount of energy to be applied at an excitation setup, as a function of the absorbable energy value associated with that excitation setup in step 530. For example, if a dissipation ratio is between 0 and 0.3 the amount of energy may be set to zero (and no energy will be applied at excitation setups associated with dissipation ratios within this range); if a dissipation ratio is between 0.3 and 0.7, the amount of applied energy may be 1 joule; and if a dissipation ratio is between 0.7 and 1, the amount of applied energy may be 0.5 joule. These are merely numerical examples, and any other example of a function of absorbability indicators may be used for determining the amounts of energy applied at the various excitation setups. In some embodiments, the amount of energy applied at an excitation setup may be a function of the absorbable energy value associated with that excitation setup, for example, the absorbable energy value may be defined by DR and energy may be applied in amounts proportional to DR, to 1/DR, etc.

In some embodiments, the amount of energy supplied during step 540 may be large enough to cause a detectable change in the properties of the object. This may be accomplished, for example, by applying energy at sufficient power levels and/or for sufficient durations to cause a change in at least one property associated with the object. The power levels and time durations may be high and long, respectively, for example, in comparison to power levels and time durations used during execution of step 520, discussed above. In some embodiments, energy application at each excitation setup of the first plurality may be shorter, e.g., by a factor of 5, 10, 100, or any intermediate of larger factor, than energy application at each excitation setup in step 540. In some embodiments, the average energy application duration per excitation setup may be shorter in step 520 than in step 540, e.g., by a factor of 10, 100, or any intermediate of larger factor. The average energy application duration per excitation setup may be equated with the total duration of energy application during execution of a step, divided by the number of excitation setups at which energy has been applied in the same step.

In some embodiments, the at least one processor may determine a weight, e.g., power level, time duration, amount of energy, or other energy application parameters, used for supplying the determined amount of energy at each excitation setup in step 540, as a function of the absorbable energy value associated with the same and/or other excitation setups. For example, an amplification ratio of amplifier 2016 may be changed inversely with the energy absorption characteristic of object 11 at each excitation setup. In some embodiments, when the amplification ratio is changed (e.g. inversely relative to the energy absorption characteristic), energy may be supplied for a constant amount of time at each excitation setup, and the energy supplied at each excitation setup may vary in line with the amplification ratio. Alternatively or additionally, the at least one processor may determine varying durations at which the energy is supplied at each excitation setup. For example, the duration and power may vary from one excitation setup to another, such that their product correlates (e.g., inversely) with the absorption characteristics of the object. In some embodiments, the processor may use the maximum available power at each excitation setup, which may vary between excitation setups. This variation may be taken into account when determining the respective durations at which the energy is supplied at maximum power at each excitation setup. In some embodiments, the at least one processor may determine both the power level and time duration for supplying the energy at each excitation setup. In certain embodiments, step 540 may involve applying RF energy at a plurality of excitation setups. Respective weights may be assigned to each of the excitation setups to be emitted, for example, based on the absorbable energy value as discussed above.

In step 560, it may be determined whether the energy transfer should be terminated. Energy application termination criteria may vary depending on application. For example, for a heating application, termination criteria may be based on time, temperature, total energy absorbed, or any other indicator that the process at issue is compete. For example, heating may be terminated when the temperature of object 11 rises to a predetermined temperature threshold. In another example, in thawing application for example, termination criteria may include any indication that the entire object is thawed. Additionally or alternatively, energy application may be stopped upon receiving a "stop" instruction, e.g., from a user interface.

If, in step 560, it is determined that energy transfer should be terminated (step 560: yes), energy transfer may end in step 570. If the criterion or criteria for termination is not met (step 560: no), the process may return to step 520, and energy may be supplied again at a first plurality of excitation setups. The first plurality of excitation setups at which energy is supplied in step 520 may vary each time step 520 is executed. In some embodiments, steps 520-540 may be repeated during object processing.

For example, after a pair of energy application cycles has been executed, the object properties may have changed, which may or may not be related to the electromagnetic energy application. Such changes may include a temperature change, translation/movement of the object (e.g., if placed on a moving conveyor belt or on a rotating plate), change in shape (e.g., mixing, melting or deformation for any reason), volume change (e.g., shrinkage or puffing), water content change (e.g., drying), flow rate change, change in phase of matter, chemical modification, etc. Therefore, at times it may be desirable to change the variables of energy application, for example, in response to these or other changes. Such a change may be accomplished by repeating steps 520, 525, and 530, and applying energy based on the results of these steps, possibly at new energy application parameters. The new energy application parameters may include, for example: a new set of excitation setups at which to apply energy; an amount of electromagnetic energy to be applied at each of the excitation setups in the set; a weighting factor; a power level of the excitation setup(s); and/or a duration at which the energy is supplied at each excitation setup in the set. Consistent with some of the presently disclosed embodiments, less excitation setups may be swept in step 520 than those swept in step 540.

Method 500 may include applying RF energy repetitively, wherein each repetition comprises: (a) applying a first amount of RF energy to the energy application zone at a first plurality of excitation setups (step 520), e.g., through one radiating element at a time; (b) receiving feedback in response to the energy application (step 525); and (c) applying a second amount of RF energy to the energy application zone at a second plurality of excitation setups (step 540). Each time step 520 is executed (e.g., as a result of a decision that energy transfer is not yet complete) may be considered a new repetition. The second plurality of excitation setups may be the same or different from the first plurality of excitation setups. The second plurality of excitation setups may include one or more excitation setups via two or more radiating elements at overlapping time periods, at a common frequency, and at controlled phase relations. In some embodiments, each execution of steps 520 or 540 may be considered an energy application cycle, and each execution of steps 520 and 540 (not separated by step 560) may be considered a pair of energy application cycles. In some embodiments, comparison of power levels, time durations, and/or amounts of energy applied during execution of step 520 and 540 may be within a single pair.

Figure 4:
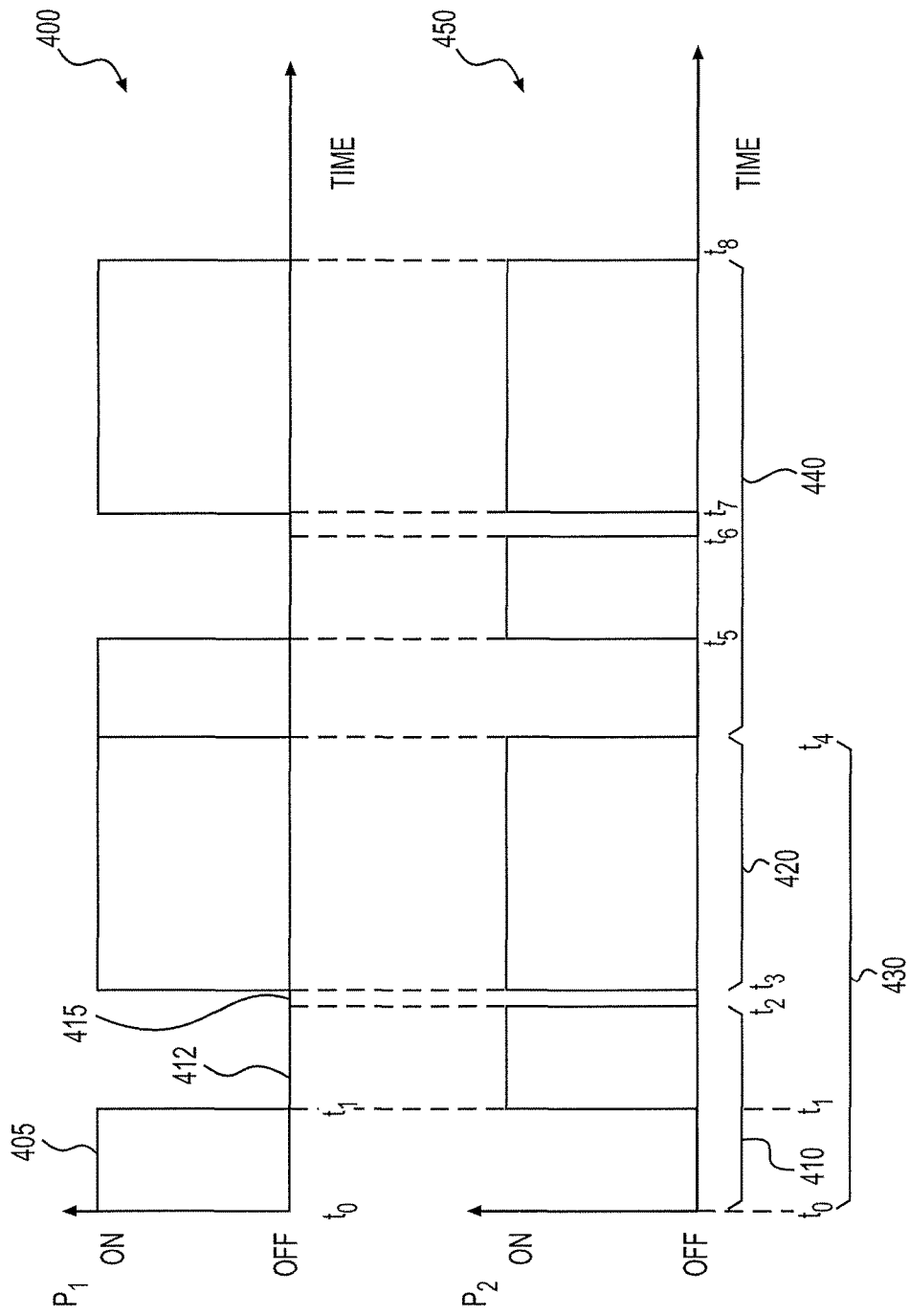
FIG. 4 is a diagrammatic representation of time durations, during which two radiating elements of an energy application unit may operate during execution of a method according to some embodiments of the invention.

FIG. 4 is a diagrammatic representation of time durations, during which two radiating elements of an energy application unit may operate during execution of method 500. The upper half of FIG. 4 (marked 400) shows operation times of radiating element No. 1, and the lower half of FIG. 4 (marked 450) shows operation times of radiating element No. 2. Although the power is shown to have two values, which may correspond to "on" and "off", in some embodiments, the power during the "on" periods may vary, for example, in accordance with hardware limitations to produce power at various frequencies.

Step 520 of FIG. 3 may be reflected in a first energy application cycle 410 shown in FIG. 4. Step 525 may take place concurrently with step 520. First energy application cycle 410 may include a first time period, from $t_0$ to $t_1$, (marked 405), during which radiating element No. 1 may emit RF radiation, while radiating element No. 2 may function as a receiver. Period 405 may be used for measuring S parameters $S_{11}$ and $S_{21}$ at a first plurality of excitation setups. The excitation setups in the first plurality may differ from each other, for example, in frequency values. First energy application cycle 410 may further include a period lasting from $t_1$ to $t_2$ (marked 412), during which radiating element No. 1 may operate in a receiving mode, and radiating element No. 2 may operate in an emitting mode. Period 412 may be used for measuring S parameters $S_{12}$ and $S_{22}$ at a second plurality of excitation setups. The excitation setups in the second plurality may differ from each other, for example, in frequency values. In some embodiments, the same frequencies are used in periods 405 and 412, such that for each frequency a set of four S parameters may be obtained: $S_{11}$, $S_{12}$, $S_{21}$, and $S_{22}$. Periods 405 and 412 collectively (i.e., the time period between $t_0$ and $t_2$, marked 410) may be termed a first energy application cycle, or first cycle. In some embodiments, the complex values of the S parameters may be measured during the first cycle, that is, both the absolute values and the phases of the S parameters may be measured.

Step 530 of method 500 may take place during a period between $t_2$ and $t_3$ (marked 415), during which both radiating elements may be inactive. Period 415 may be utilized for computing energy absorption efficiencies or other parameters, based on feedback received from the energy application zone during the first energy application cycle, e.g., based on the measured S parameters. The computed parameters may be associated with excitation setups not applied during the first cycle. For example, parameters may be computed for excitation setups where the two radiating elements emit energy at overlapping time periods, although this has not happened during first cycle 410.

During a fourth time period, going between $t_3$ and $t_4$ and marked 420, energy may be applied via both radiating elements simultaneously. Furthermore, in some embodiments, a phase relation between radiations emitted by the two radiating elements may be controlled. For example, energy may be emitted by the two radiating elements simultaneously, at different phase relations consecutively. For example, energy may be applied at 800 MHz at phase differences of 30°, 60°, and 90°. In some embodiments, frequencies may also be controlled to change consecutively. For example, in the preceding example, after application of energy at 800 MHz at phase differences of 30°, 60°, and 90°, energy may be applied at 820 MHz at the same phase difference (i.e., 30°, 60°, and 90°), and so on. Energy application along period 420 may be termed a second energy application cycle, or a second cycle. The first cycle and the second cycle together (in some embodiments, in conjunction with the period going between $t_2$ and $t_3$) may compose pair 430 of energy application cycles, or a pair. A second pair of energy application cycles, going from $t_4$ to $t_8$ is also shown in FIG. 4, and marked 440. In some embodiments, a frequency sweep is performed at each antenna, and S parameters are measured for each frequency. For example, in a system with two antennas, during a frequency sweep of antenna 1, $S_{11}$ and $S_{21}$ may be measured at each frequency, and during a frequency sweep of antenna 2, $S_{22}$ and $S_{12}$ may be measured at each frequency. Based on these measurements, DR may be calculated at the swept frequencies for any phase relation, e.g., using equation A shown above.

It is noted that energy application according to some embodiments of the invention may include a first energy application cycle at a plurality of excitation setups and may also include a second energy application cycle, which includes energy application at one or more excitation setups not included applied in the first energy application cycle.

In some embodiments, energy application in the second cycle is based on feedback received in response to energy application in the first cycle.

Alternatively, or additionally to basing the energy application in the second cycle on the feedback, energy application in the first cycle may be for an average duration per excitation setup shorter than an average duration of an excitation setup during the second energy application cycle. If energy is applied at a plurality of pairs of cycles (each pair comprising a first cycle and a second cycle), the averages may be measured for each pair separately. In some embodiments, the averages may be calculated over multiple pairs, such that over the multiple pairs, the average amount of energy applied per excitation setup in all first cycles is smaller than the average amount of energy applied per excitation setup in all second cycles.

Still alternatively, or additionally to basing the energy application in the second cycle on the feedback, more energy per excitation setup may be applied on the average during the second cycle than during the first cycle. Here also, if energy is applied at a plurality of pairs of cycles (each pair comprising a first cycle and a second cycle), the averages may be measured for each pair separately, or, in some embodiments, over a plurality of pairs.

Still alternatively, or additionally to basing the energy application in the second cycle on the feedback, higher power level may be used (on the average per excitation setup) during the second cycle than during the first cycle. Here also, if energy is applied at a plurality of pairs of cycles (each pair comprising a first cycle and a second cycle), the averages may be measured for each pair separately, or, in some embodiments, over a plurality of pairs.

In some embodiments, a method of processing an object in an energy application zone (e.g., method 500) may include applying RF energy to the energy application zone at excitation setups, each being characterized by two or more radiating elements that emit, at overlapping time periods, signals of a common frequency (e.g., in step 520). Step 530 may then include calculating values indicative of energy absorbable in the object at multiple excitation setups, characterized by the common frequency and differing phase combinations, amplitude combinations, or both phase combinations and amplitude combinations. The calculation may be based on measurements taken at other excitation setups characterized by the common frequency (e.g., measurements made at step 525), and applying the RF energy based on the calculated values (e.g., in step 540).

The measurements may include measuring parameters indicative of electrical responses of the energy application zone with the object therein to electrical signals characterized by the common frequency. Such parameters may include, for example, gamma parameters, S parameters, or other kind of network parameters and/or combinations thereof. The electrical signal may include any electrical field applied to the energy application zone through the radiating elements.

The method may include calculating the values indicative of energy absorbable in the object based on the measured parameters (e.g., in step 530). In some embodiments, this calculation may be further based on the phase combination and/or amplitude combination characterizing the excitation setups for which the values are calculated.

In some embodiments, applying the RF energy based on the calculated values (e.g., in step 540) may include selecting excitation setups from the multiple excitation setups for which values indicative of energy absorbable in the object were calculated. The selection may be based on the calculated values. Energy application at the selected excitation setup may include controlling a source of RF energy (e.g., source 2010) to generate RF signals of a common frequency and different phase combinations and/or different amplitude combinations.

In some embodiments, applying the RF energy may further include choosing, for each excitation setup to be applied, energy application parameters. The energy application parameter may include, for example, time duration for which the excitation setup is applied and/or power level at which the excitation setup is applied. Application of the RF energy may then include application at the chosen energy application parameters.

In some embodiments, the method may include application of RF energy at a plurality of frequencies. In some such embodiments, energy may be applied (e.g., in step 520) each time at a different frequency and/or through a different radiating element. For example, first one antenna may emit energy consecutively at some frequencies, and then another antenna may emit energy at the same frequencies, and so one. Then, the calculation of values indicative of energy absorbable in the object may be automatically repeated at each repetition for a different one of the frequencies. In some embodiments, excitation setups selected for application may include two (or more) excitation setups characterized by the same frequency.

Figure 5:
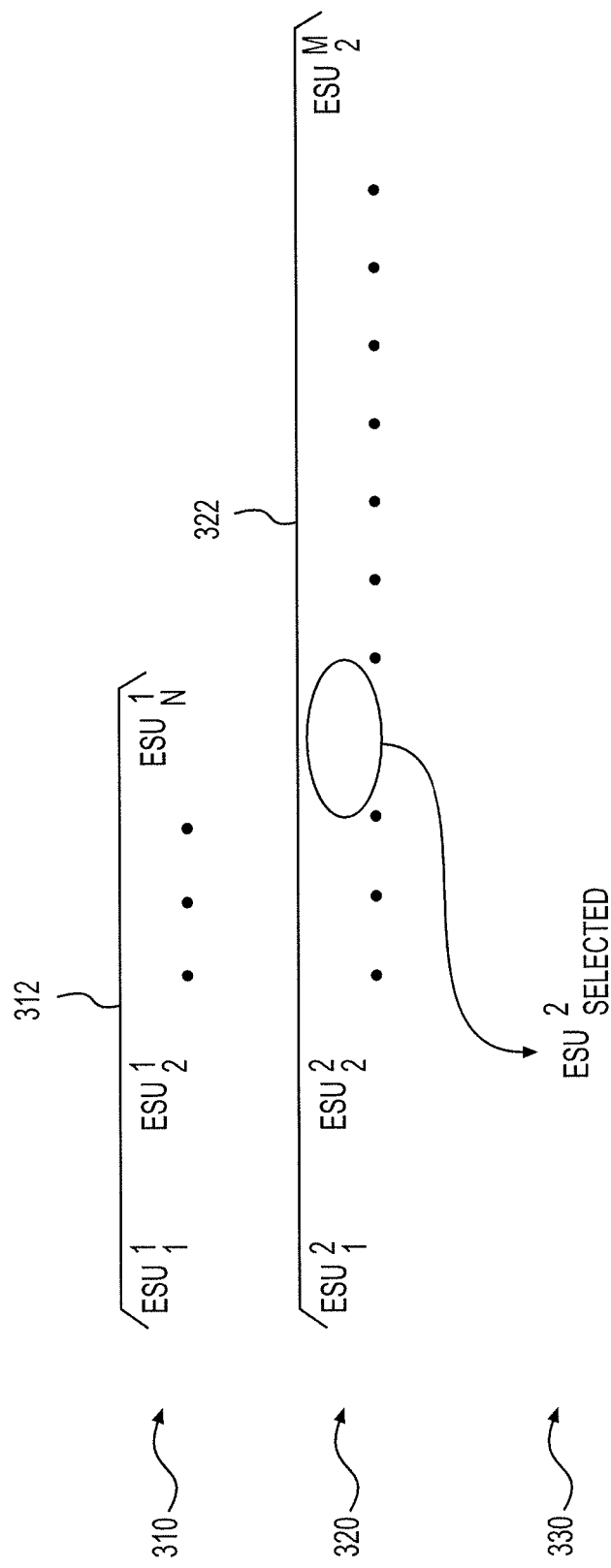
FIG. 5 is a diagrammatic presentation of a method according to some embodiments of the invention.

FIG. 5 is a diagrammatic presentation of a method according to some embodiments of the invention, emphasizing the number of excitation setups that may be used at each stage. In a first stage, marked 310, which may include step 520 of FIG. 3, energy may be applied to a first plurality of excitation setups, collectively marked 312, and feedback may be received in response to this energy application. In the figure, all the excitation setups applied during the first stage are marked with a superscript 1, and a subscript denoting a serial number of the excitation setup within the first plurality of excitation setups.

Then, in a second stage, marked 320, which may include step 530 of FIG. 3, one or more parameter values may be determined for each of a second plurality of excitation setups, based on the feedback. Each of the determined values may be associated with the respective excitation setup, for which it was determined. The second plurality of excitation setups, marked collectively 322, may include excitation setups not included in the first plurality, or even may consist of excitation setups not included in the first plurality. For example, in the first stage, energy may be applied via each radiating element separately, and all the excitation setups in the second plurality may involve energy application by two or more radiating elements at overlapping time periods, e.g., at a controlled phase difference and/or at a common frequency. As apparent in the figure, the number of excitation setups in the second plurality (designated by M) may be larger than the number of excitation setups in the first plurality (designated by N). In some embodiments, M may be larger than N by a factor of 2, 5, 10, 15, or any intermediate or larger factor.

In a third stage, marked 330, which may include, for example, step 540 of FIG. 3, energy may be applied at one or more of the excitation setups, to which parameter values were associated in the second stage. In the depicted example, only one excitation setup (marked in the figure as $ESU_{selected}^2$) has been selected for energy application in the third stage. In other embodiments, however, other numbers of excitation setups may be selected for energy application.

Equation (A) below shows how a DR value may be associated with any amplitude relation ($\vec{a}$) and phase relation ($\vec{\varphi}$) between radiations emitted by n radiating elements, based on measurements taken when only one radiating element emits RF radiation at any given time period. Equation A' is for a single frequency. Similar calculations may be carried out at various frequencies, at each of which the measured S parameters may be different and the phase and amplitude relations may be controlled.

$$DR(\vec{a}, \vec{\varphi}) = 1 - \frac{\sum_{i=1}^{n} \left| \sum_{k=1}^{n} s_{ik} |a_{ki}| e^{j\varphi_{ki}} \right|^2}{\sum_{k=1}^{n} |a_{k1}|^2} \quad (A')$$

In equation (A'), $\vec{a}$ represents relations between amplitudes of voltages supplied to the radiating elements and $\vec{\varphi}$ represents relations between phases of voltages supplied to the radiating elements. $S_{ik}$ is a complex scattering parameter, representing the ratio $v_i^-/v_k^+$, wherein $V_i^-$ represents the (complex) voltage received at radiating element of index i when the (complex) voltage supplied at the radiating element indexed k was $V_k^+$ and all radiating elements other than k are inactive; $|a_{ki}|$ is the ratio between amplitudes of voltages concurrently supplied to radiating elements k and i; and $\varphi_{ki}$ is the phase difference between voltages concurrently supplied to radiating elements k and i. j represents the square root of −1. Equation A' is similar to equation A, shown above, but in A' the parameters $|a_{ki}|$ are ratios between amplitudes, and in equation A the corresponding parameters $a_k$ are amplitudes.

In some embodiments, the values of $|a_{ki}|$ and/or $\varphi_{ki}$ may be controlled, e.g., by processor 2030. In some embodiments, the amplitude ratio $|a_{ki}|$ may be fixed, and only phase differences may be controlled. In some embodiments, the phase differences may be fixed, and only amplitude ratios may be controlled. Thus, for every frequency there may be measured a set of S parameters, based on which there may be calculated a DR value for each set of amplitude and phase relationships. Among such relationships, some may be selected for application based on the DR values calculated for them. For example, in some embodiments, relationships for which DR values between some upper threshold and some lower threshold may be selected. The thresholds may be predetermined (e.g., the upper threshold may be 0.9 and the lower threshold may be 0.5). In some embodiments, the thresholds may be determined dynamically, for example, in relation to $DR_{max}$, which may be defined as the highest DR value calculated to be obtainable at the frequency, for which the calculations were carried out. For example, the lower threshold may be $0.6DR_{max}$, and the upper threshold may be $0.85\ DR_{max}$.

In some embodiments, absorbability indicators other than DR may be calculated based on the complex S parameters, phase relation, and amplitude relations. These may include, for example, 1-DR or any other function of DR, for example, (1-DR) $\sum_{k=1}^{n}|a_{k1}|^2 = \sum_{i=1}^{n}|\sum_{k=1}^{n}S_{ik}|a_{ki}|e^{j\varphi_{ki}}|^2$. The latter absorbability indicator may be particularly useful, for example, when $\sum_{k=1}^{n}|a_{k1}|^2$ is controlled to be the same for all the excitation setups, for example, when $a_{k1}$ is the same for all values of k and at all the excitation setups.

To measure the complex S parameters, a detector detecting received feedback may include a phase detector configured to detect phase values associated with the electromagnetic feedback received, for example, from available radiating elements. In some embodiments, each repetition of stage 310 includes energy application at the same first plurality of excitation setups; each repetition of stage 320 includes associating control parameters with the same second plurality of excitation setups; and each repetition of energy applications 330 may be at a differing selected plurality of excitation setups.

In some embodiments, the amplitude and the phase of the supplied radiation may be controlled, and thus may be known. In some embodiments, however, the amplitude and phase may also be measured to verify that the energy application unit is controlled as intended. In some embodiments, the received voltage at each radiating element and/or the scattering parameters may be measured when no two radiating elements transmit at overlapping time periods. Based on these measurements, a DR value may be calculated for each phase relation ($\vec{\varphi}$) and amplitude relation ($\vec{a}$) in accordance with equation (A).

In some embodiments, measurement of DR as a function of the phase relation may be calculated based on real (rather than complex) parameters. This may omit the need to use a phase detector. Thus, in some embodiments, the feedback received is indicative only, or substantially only of the amplitude (absolute value) of the detected parameter. The number of measurements required for calculating DR at any number of phase relations may be smaller than the number of phase relations, albeit larger than twice the number of power feeds. For example, the phase independent parameters may be $|\Gamma_i|^2$, which may be equated with the ratio between power received at feed i and power supplied through feed i at a given excitation setup. The absolute value of the reflection coefficient measured at a feed indexed i may be given by the equation $$|\Gamma_i|^2 = \frac{P_i^{received}}{P_i^{supplied}}.$$

Thus, measuring powers (or other scalar values that scale with the power) may allow obtaining the absolute values of the reflection coefficients.

On the other hand, the (complex) reflection coefficient $\Gamma_i$ may be expressed by equation (B):

$$\Gamma_i = \sum_{j=1}^{n} \frac{V_j^+}{V_i^+} S_{i,j} \qquad (B)$$

wherein n is the number of power feeds, $V_j^+$ is the voltage supplied through the feed of index j, and $S_{i,j}$ is a scattering parameter. $V_j^+$ has an absolute value and a phase, both of which may be controlled, e.g., by processor 2030. Based on equation B, another set of equations may be written, in which $|\Gamma_i|^2$ may be expressed as a function of the complex S parameters. Thus, every measurement of a reflection coefficient $|\Gamma_i|^2$ may be a value given by an equation with $n^2$ complex unknown values $S_{i,j}$. These equations may be solved for all the scattering parameters if measurements are provided for a sufficient number of phase relations. This sufficient number is usually larger than 2n. For example, if there are four power feeds, and the amplitude relations between them is fixed, e.g., at a value of 1, measuring $|\Gamma_i|^2$ at 13 phase relations may suffice to obtain the values of all the 16 complex S parameters, based on which DR may be calculated for any other phase relation using equation (A). Thus, a method according to some embodiments may include (a) measuring magnitudes of gamma parameters at a first plurality of excitation setups; (b) calculating, based on the measured magnitudes, complex S parameters, (c) calculating, based on the calculated complex S parameters, dissipation ratios at one or more excitation setups not included in the first plurality of excitation setups; and (d) applying energy based on the calculated dissipation ratios.

In some embodiments, in a first energy application cycle, measurements may be made at a first plurality of phase relations. Based on these measurements, DR may be associated with each phase relation of a second plurality of phase relations. The second plurality of phase relations may include any phase relation, including, but not limited to, those included in the first plurality of phase relations. For example, the first plurality of phase relations may include 13 phase relations, and the second plurality of phase relations may include 64 phase relations. At least 51 of the 64 phase relations included in the second plurality of phase relations are different than the 13 phase relations at which measurements have taken part in practice. Then, one or more phase relations may be selected from the second plurality of phase relations, e.g., based on the DR value associated with the phase relations included in the second plurality of phase relations. Then, in a second energy application cycle, energy may be applied to the energy application zone at the selected phase relation(s) so as to heat or otherwise process the object. The second energy application cycle may be longer than the first energy application cycle, and/or may include application of more energy than applied in the first energy application cycle.

For example, the average amount of energy applied per excitation setup (e.g., per phase relation) at each of the excitation setups in the first plurality of excitation setups may be larger than the average amount of energy applied per excitation setup in the second energy application cycle. The average amount of energy applied per excitation setup in an energy application cycle may be calculated by dividing the total energy applied during the energy application cycle by the number of different excitation setups, at which energy was applied during the same energy application cycle.

Additionally or alternatively, the average duration of energy application per excitation setup (e.g., per phase relation) at each of the excitation setups in the first plurality of excitation setups may be smaller than the average duration of energy application per excitation setup in the second energy application cycle. The average duration of energy application per excitation setup in an energy application cycle may be calculated by dividing the total duration of energy application in the energy application cycle by the number of different excitation setups, at which energy was applied during the same energy application cycle.

Figure 6:
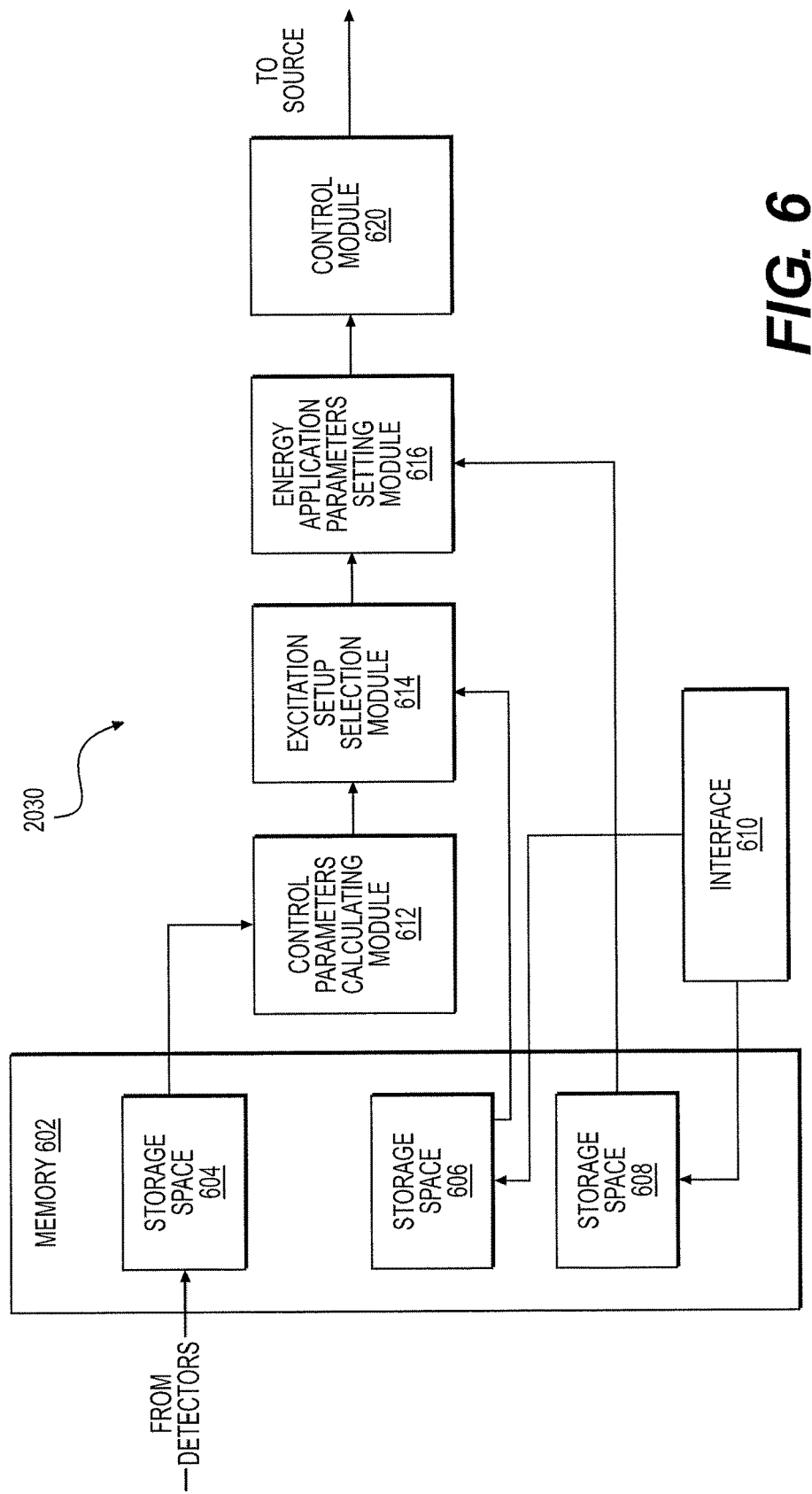
FIG. 6 is a diagrammatic presentation of a processor according to some embodiments of the invention.

FIG. 6 is a diagrammatic representation of a processor (e.g. processor 2030) configured to control a source of RF energy based on electromagnetic feedback according to some embodiments of the invention. Processor 2030 may include a memory 602 or have access to an external memory. The memory may have a storage space 604 for storing feedback received from the detectors. Some examples of data that may be stored in storage space 604 include values of S parameters, for example, magnitudes of S parameters and/or phases thereof. Some additional examples may include gamma parameters: scalar (e.g., magnitudes only), or complex (e.g., magnitude and phases). The content of storage space 604 may be refreshed, for example, each time an excitation sweep is carried out to obtain feedback from the energy application zone. Memory 602 may further include storage space 606, for storing excitation setups selection rules. These rules may determine which excitation setup is selected for application, and which is not, based on control parameter associated with each of the excitation setups. For example, the control parameter may be a dissipation ratio, and the rule may be that only excitation setups associated with dissipation ratios within a given range are selected for application. Memory 602 may also include a storage space 608 for storing rules for setting energy application parameters. These rules may indicate, for example, at what power level and for what duration each selected excitation setup may be applied at a given energy application cycle.

In some embodiments, excitation setup selection rules may be set through an interface (610), for example, user interface. In some embodiments, different rule sets may be available in memory 602, and the interface allows a user to select between them. Similarly, rules for setting energy application parameters may be set through interface 610.

The feedback parameters stored in storage space 604 may be retrieved for use by control parameter calculation module 612. Module 612, as well as other modules described below, may be embodied in a software module, hardware module, or may comprise both software and hardware components associated with the processor. Module 612 may be configured to calculate control parameters based on feedback parameters retrieved from memory 602. For example, module 612 may calculate dissipation ratios at various phase combinations based on complex s parameters saved on memory 602. Module 612 may associate each excitation setup with the control parameter calculated for the excitation setup.

Processor 2030 may further include an excitation setup selection module 614. Excitation setup selection module 614 may select excitation setups for application based on the control parameter associated with them by control parameter calculating module 612 and rules retrieved from storage space 606.

In some embodiments, processor 2030 may further include energy application parameters setting module 616. Module 616 may set, for each excitation setup selected for application by module 614, energy application parameters, for example power level and energy transmission duration. The module may set the energy application parameters based on rules retrieved, for example, from storage space 608, and control parameters calculated, e.g., for the selected excitation setups, by module 612.

Processor 2030 may also include a control module 620 that sends the appropriate control signals to source 2010 (FIGS. 1A and 1B), so as to apply the selected excitation setups at the set energy application parameters. The control signals may include, for example, frequency control signals, phase control signals, and amplitude control signals.

In the foregoing Description of Exemplary Embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate embodiment of the invention.

Moreover, it will be apparent to those skilled in the art from consideration of the specification and practice of the present disclosure that various modifications and variations can be made to the disclosed systems and methods without departing from the scope of the invention, as claimed. For example, one or more steps of a method and/or one or more components of an apparatus or a device may be omitted, changed, or substituted without departing from the scope of the invention. Thus, it is intended that the specification and examples be considered as exemplary only, with a true scope of the present disclosure being indicated by the following claims and their equivalents.

What is claimed:

1. An apparatus for processing an object in a cavity by application of radio frequency (RF) energy via a plurality of radiating elements, the apparatus comprising:
    a source of RF energy, configured to supply RF energy to the plurality of radiating elements at controlled frequencies and phase differences;
    a phase modulator;
    a controller configured to:
        control the phase modulator to determine the phase differences among the RF energy supplied to the plurality of radiating elements; and
        cause the source of RF energy to apply a first amount of RF energy to the cavity at a first plurality of excitation setups by applying RF energy via the plurality of the radiating elements at a common frequency and during overlapping time durations at the determined phase differences;
    at least one detector connected to the plurality of radiating elements; and
    said at least one detector being configured to detect, for each radiating element of the plurality of radiating elements, a parameter indicative of a relation between power output from the cavity to each radiating element and power input from each radiating element to the cavity;
    wherein the controller is further configured to:
        select at least one excitation setup not included in the first plurality of excitation setups based on the parameters detected by the at least one detector during the application of the first amount of RF energy; and
        cause the source to apply a second amount of RF energy to the cavity at the selected at least one excitation setup.

2. The apparatus of claim 1, wherein the apparatus is devoid of a phase detector.

3. The apparatus of claim 1, wherein the source allows the controller to control the frequency of RF energy supplied by the source to each of the radiating elements, and further control a phase difference between RF signals supplied by the source to different ones of the radiating elements.

4. The apparatus of claim 3, wherein the source allows the controller to control an amplitude ratio or amplitude difference between RF signals supplied by the source to different ones of the radiating elements during overlapping time periods.

5. The apparatus of claim 1, wherein the source allows the controller to control the frequency of RF energy supplied by the source to each of the radiating elements, and further control an amplitude ratio or amplitude difference between RF signals supplied by the source to different ones of the radiating elements during overlapping time periods.

6. The apparatus of claim 1, wherein the controller is configured to:
    determine a control parameter for each excitation setup included in a second plurality of excitation setups based on indications of detected parameters received from the detector for the first plurality of excitation setups; and
    select the at least one excitation setup not included in the first plurality of excitation setups based on determined control parameters.

7. The apparatus of claim 6, wherein the control parameter is a scattering parameter.

8. The apparatus of claim 6, wherein the control parameter is a dissipation ratio.

9. The apparatus of claim 6, wherein the controller is configured to determine each control parameter by analytic calculations based on the parameters detected by the detector.

10. The apparatus of claim 1, wherein at least two of the plurality of radiating elements are configured to operate in a receiving mode and in an emitting mode.

11. The apparatus of claim 1, wherein, when one of the plurality of radiating elements operates in a receiving mode another of the plurality of radiating elements operates in an emitting mode.

12. The apparatus of claim 1, wherein the parameter is at least one of:
    a scalar parameter;
    a measured parameter; and
    a calculated parameter.

13. A microwave heating apparatus for processing an object in a cavity by application of radio frequency (RF) energy, the apparatus comprising:
    a plurality of radiating elements disposed inside the cavity;
    a source of RF energy, configured to supply RF energy to the plurality of radiating elements at controlled frequencies and phase differences;
    a phase modulator;
    a controller configured to:
        control the phase modulator to determine the phase differences among the RF energy supplied to the plurality of radiating elements; and cause the source of RF energy to apply a first amount of RF energy to the cavity at a first plurality of excitation setups by applying RF energy via the plurality of the radiating elements at a common frequency and during overlapping time durations at the determined phase differences; and each of the plurality of radiating elements being connected to at least one detector that is configured to detect, for each radiating element of the plurality of radiating elements, a parameter indicative of a relation between power output from the cavity to the radiating element and power input from the radiating element to the cavity;

wherein the controller is further configured to:

select at least one excitation setup not included in the first plurality of excitation setups based on the parameters detected by the at least one detector during the application of the first amount of RF energy; and cause the source to apply a second amount of RF energy to the cavity at the selected at least one excitation setup.

14. The apparatus of claim 13, wherein the parameter is at least one of:
a scalar parameter;
a measured parameter; and
a calculated parameter.

15. An apparatus for processing an object in a cavity by application of radio frequency (RF) energy via a plurality of radiating elements, the apparatus comprising:
a source of RF energy, configured to supply RF energy to the plurality of radiating elements at controlled frequencies and phase differences;
a phase modulator;
a controller configured to:

control the phase modulator to determine the phase differences among the RF energy supplied to the plurality of radiating elements; and cause the source of RF energy to apply RF energy to the cavity at a first plurality of excitation setups by applying the first amount of RF energy via the plurality of the radiating elements at a common frequency and during overlapping time durations at the determined phase differences;

at least one detector connected to the plurality of radiating elements; and said at least one detector being configured to detect, for each radiating element of the plurality of radiating elements, a parameter indicative of a relation between power output from the cavity to each radiating element and power input from each radiating element to the cavity;

wherein the controller is further configured to:

select at least one excitation setup not included in the first plurality of excitation setups based on the parameters detected by the at least one detector during the application of the first amount of RF energy; and cause the source to apply a second amount of RF energy to the cavity at the selected at least one excitation setup, and wherein each said excitation setup is associated with a dissipation ratio indicative of a ratio of power absorbed by the object in the cavity to power supplied to the plural radiating elements.

16. The apparatus of claim 15, wherein the parameter is at least one of:
a scalar parameter;
a measured parameter; and
a calculated parameter.

* * * * *